US010063899B2

(12) United States Patent
Peterson et al.

(10) Patent No.: US 10,063,899 B2
(45) Date of Patent: *Aug. 28, 2018

(54) SYSTEM AND METHODS FOR AUTOMATICALLY OBTAINING COST-EFFICIENT ACCESS TO A MEDIA CONTENT COLLECTION

(71) Applicant: Rovi Guides, Inc., San Carlos, CA (US)

(72) Inventors: Brian Craig Peterson, Barrington, IL (US); William J. Korbecki, Crystal Lake, IL (US); Jonathan Arme, Frankfort, IL (US); Brian Fife, Concord, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,184

(22) Filed: Feb. 13, 2017

(65) Prior Publication Data
US 2017/0272797 A1    Sep. 21, 2017

Related U.S. Application Data

(63) Continuation of application No. 13/535,053, filed on Jun. 27, 2012, now Pat. No. 9,609,374.

(51) Int. Cl.
| | |
|---|---|
| *H04N 7/16* | (2011.01) |
| *H04N 21/2543* | (2011.01) |
| *G06Q 30/00* | (2012.01) |
| *H04N 21/472* | (2011.01) |
| *H04N 21/478* | (2011.01) |
| *H04N 21/231* | (2011.01) |
| *G06Q 10/00* | (2012.01) |

(52) U.S. Cl.
CPC ........ *H04N 21/2543* (2013.01); *G06Q 10/00* (2013.01); *G06Q 30/00* (2013.01); *H04N 21/23109* (2013.01); *H04N 21/47211* (2013.01); *H04N 21/47815* (2013.01)

(58) Field of Classification Search
USPC ...................... 705/14.23, 26, 400; 725/40, 5
See application file for complete search history.

(56) References Cited

U.S. PATENT DOCUMENTS

| | | | |
|---|---|---|---|
| 8,374,922 B1* | 2/2013 | Antony | G06Q 30/00 705/26.1 |
| 8,584,165 B1* | 11/2013 | Kane | H04N 21/2225 707/784 |
| 2002/0128920 A1* | 9/2002 | Chopra | G06Q 30/06 705/26.8 |

(Continued)

Primary Examiner — An Son P Huynh
(74) Attorney, Agent, or Firm — Haley Guiliano LLP

(57) ABSTRACT

Systems and methods for automatically obtaining cost-efficient access to a media content collection are provided. A user selection of a media content collection, which consists of a number of media assets, is received. A first price is determined for receiving access to the entire media content collection using a single transaction. For each media asset of the media content collection a set of providers of the media asset are identified, and the lowest price for receiving access to each media asset is determined. The lowest price for receiving access to each media asset of the media content collection is accumulated to determine a second price for receiving access to the media content collection using multiple transactions. The first and the second price are compared, and access to the media content collection is received based on this comparison.

14 Claims, 15 Drawing Sheets

(56) References Cited

U.S. PATENT DOCUMENTS

| | | | |
|---|---|---|---|
| 2002/0174076 A1* | 11/2002 | Bertani | G06F 17/30864 705/400 |
| 2002/0174430 A1* | 11/2002 | Ellis | G11B 27/005 725/46 |
| 2006/0059062 A1* | 3/2006 | Wood | G06Q 30/0603 705/35 |
| 2006/0248114 A1* | 11/2006 | Anderson | G06Q 30/06 |
| 2007/0154163 A1* | 7/2007 | Cordray | H04N 5/782 386/278 |
| 2007/0185775 A1* | 8/2007 | Lawton | G06Q 30/06 705/80 |
| 2008/0059884 A1* | 3/2008 | Ellis | H04N 5/44543 715/721 |
| 2009/0144153 A1* | 6/2009 | Kondrk | G06Q 30/0277 705/14.73 |
| 2009/0164383 A1* | 6/2009 | Rothman | G06Q 30/0206 705/80 |
| 2009/0183081 A1* | 7/2009 | Rodriguez | G06Q 30/0601 715/733 |
| 2009/0248700 A1* | 10/2009 | Amano | G06F 17/30616 |
| 2010/0031162 A1* | 2/2010 | Wiser | G06Q 30/0255 715/747 |
| 2010/0186025 A1* | 7/2010 | Thomas | G06F 3/0481 725/5 |
| 2010/0287030 A1* | 11/2010 | Sinha | G06Q 30/02 705/26.5 |
| 2011/0099082 A1* | 4/2011 | Walker | G06Q 30/00 705/26.8 |
| 2012/0089480 A1* | 4/2012 | Fusz | G06Q 30/06 705/26.41 |
| 2012/0095829 A1* | 4/2012 | Harper | G06Q 10/08 705/14.49 |
| 2012/0158536 A1* | 6/2012 | Gratton | G06Q 30/0631 705/26.7 |
| 2012/0284105 A1* | 11/2012 | Li | G06Q 30/02 705/14.23 |
| 2013/0138477 A1* | 5/2013 | Wilkins | G06Q 30/0629 705/7.31 |
| 2014/0114812 A1* | 4/2014 | Rothman | G06Q 30/02 705/26.62 |

* cited by examiner

SYSTEM AND METHODS FOR AUTOMATICALLY OBTAINING COST-EFFICIENT ACCESS TO A MEDIA CONTENT COLLECTION

CROSS-REFERENCE TO RELATED APPLICATIONS

This application is a continuation of U.S. application Ser. No. 13/535,053, filed Jun. 27, 2012 (currently allowed), which is hereby incorporated by reference in its entirety.

BACKGROUND

Content providers oftentimes offer media content collections. This can be, for example, a set of episodes of a television show that make up a season, a set of movies in a movie series, or the set of broadcasts of sport events that make up a tournament. Simultaneously, the same or a different content provider may also offer the individual media assets of the media content collection. For example, a content provider may allow a user to purchase either a full season of a television show, the individual episodes, or both.

Furthermore, the number of content providers is constantly growing. A user can purchase media assets or media content collections from a number of sources such as through a set top box, personal computer, or even a physical store. The purchase itself may entail downloading the media content, receiving permission to access it, or receiving physical merchandise (e.g., a DVD). Therefore, the user has progressively more options to choose from and compare when deciding from where to purchase a media asset or a media content collection.

SUMMARY

In view of the foregoing, systems and methods for automatically obtaining cost-efficient access to a media content collection are provided.

In some embodiments, a user selection of a media content collection, which consists of a number of media assets, is received. A first price is determined for receiving access to the entire media content collection using a single transaction. For each media asset of the media content collection a set of providers of the media asset are identified, and the lowest price for receiving access to each media asset is determined. The lowest price for receiving access to each media asset of the media content collection is accumulated to determine a second price for receiving access to the media content collection using multiple transactions. The first and the second price are compared, and access to the media content collection is received based on this comparison.

In some embodiments, the media content collection is a season of episodes of a show or all episodes of the show, in which case the individual media assets of the media content collection are the episodes that constitute the media content collection.

In some embodiments, receiving access to the media content collection using multiple transactions involves communicating with a first server to complete a first financial transaction and receive access to a first media asset from a first provider and communicating with a second server to complete a second financial transaction and receive access to a second media asset from a second provider.

In some embodiments, receiving access to a media content collection using multiple transactions involves receiving digital data containing each media asset over a network connection from a server associated with the corresponding provider. In some embodiments, receiving access to the media content collection using multiple transactions involves storing a digital media file for each media asset of the media content collection.

In some embodiments, receiving access to a media content collection using a single transaction involves communicating with a server to complete a single financial transaction and causing the provider to ship physical merchandise with the media content collection to the user.

In some embodiments, receiving access to a media content collection using a single transaction involves communicating with a server to complete a single financial transaction and, in response to completing the transaction, receiving digital data with the media content collection over a network connection from a sever associated with the provider.

In some embodiments, identifying providers of a media asset involves generating a search query, transmitting the search query over a network connection, and, in response, receiving information identifying providers of the media asset.

In some embodiments, identifying providers of a media asset involves retrieving information identifying potential providers from a database, communicating with servers associated with each of the potential providers, and determining whether each potential provider can actually provide access to the media asset.

In some embodiments, the systems and methods determine for each media asset of the media content collection whether the media asset is accessible without a financial transaction and set the price of that media asset to zero if it is.

BRIEF DESCRIPTION OF THE DRAWINGS

The above and other features of the present application, its nature and various advantages will become more apparent upon consideration of the following detailed description, taken in conjunction with the accompanying drawings, in which like reference characters refer to like parts throughout, and in which.

DETAILED DESCRIPTION OF EMBODIMENTS

Figure 1:
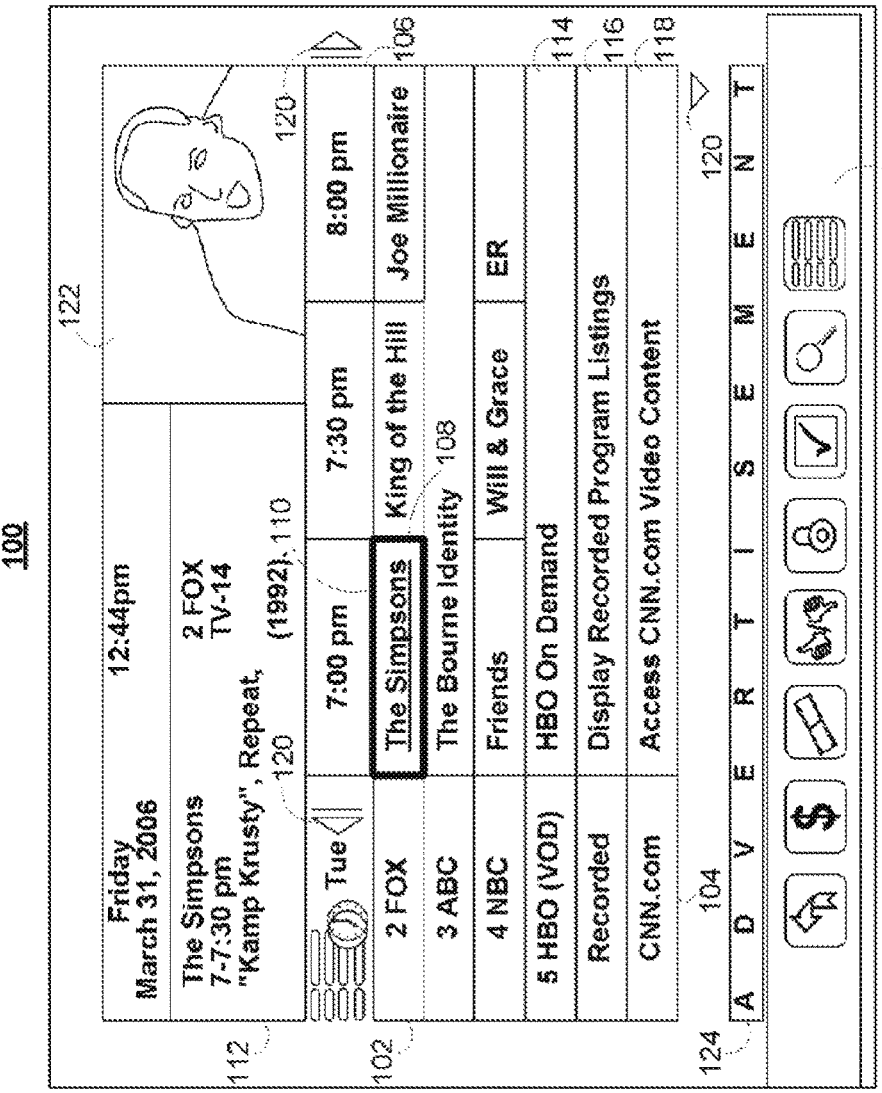
FIGS. 1 and 2 show illustrative display screens that may be used to provide media guidance application listings in accordance with some embodiments of the invention.

The amount of content available to users, including media assets and media content collections available for purchase, in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
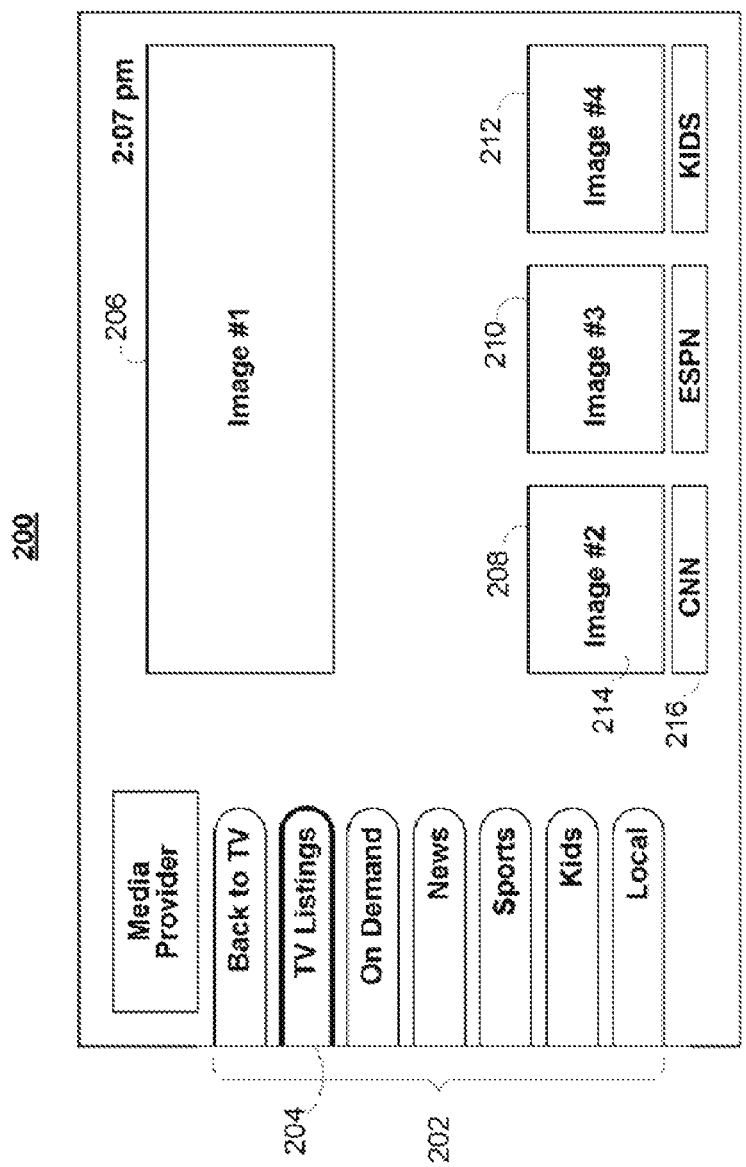

FIGS. 1-2 show illustrative display screens that may be used to provide media guidance data. The display screens shown in FIGS. 1-2 and 6A-9 may be implemented on any suitable user equipment device or platform. While the displays of FIGS. 1-2 and 6A-9 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0100499, filed Jan. 17, 2003; Ward, III et al. U.S. Pat. No. 6,656,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, options to purchase media assets or media content collections, options to automatically obtain cost-efficient access to a media content collection or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
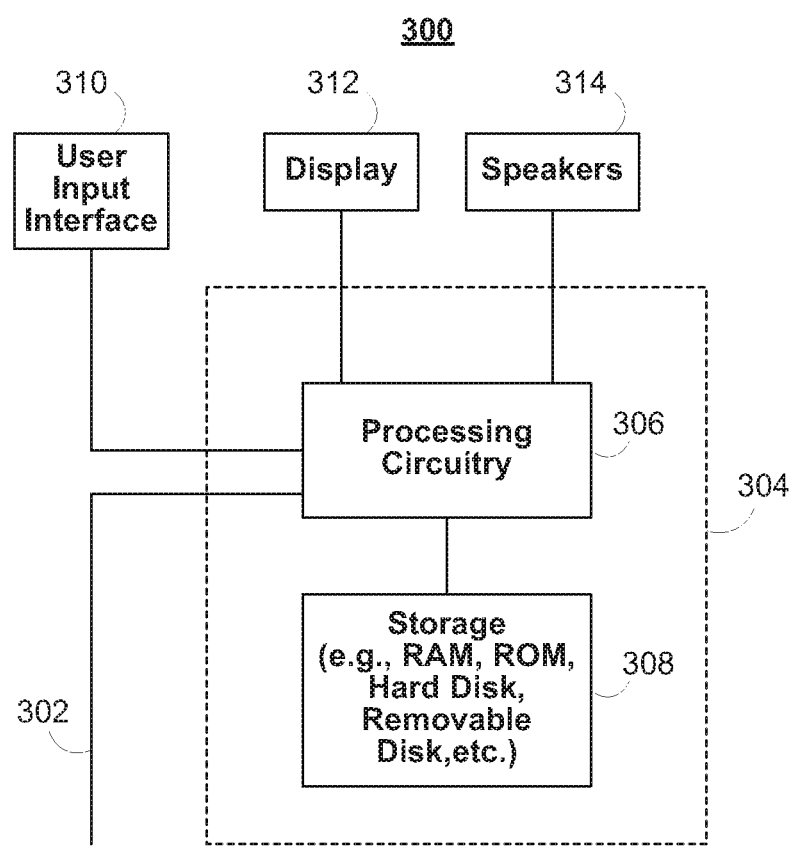
FIG. 3 shows an illustrative user equipment device in accordance with some embodiments of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 5. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 5, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
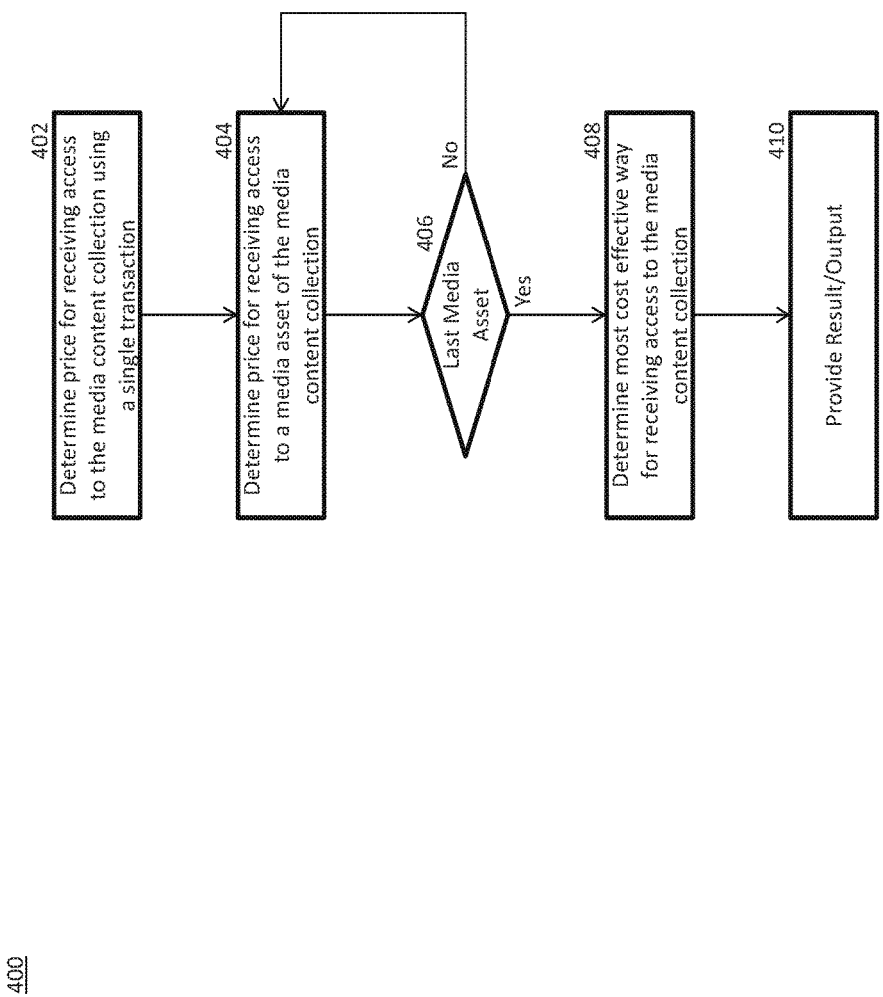
FIG. 4 is a flowchart of a process for comparing the price of accessing a media content collection using a single transaction with the price of accessing the media content collection using multiple transactions in accordance with some embodiments of the invention.

Processor circuitry 306, or processor circuitry of a server in communication with user equipment device 300, may be used to execute process 400 of FIG. 4. Process 400 compares the price of receiving access to a media content collection using a single transaction to the price of receiving access to a media content collection using multiple transactions. FIG. 4 provides a general overview of process 400, while more detailed embodiments of the steps involved in performing process 400 are presented further below with respect to FIGS. 10-12.

A media content collection is a collection of media assets that could be provided independently of one another, but are available for purchase as a single item. This may be the episodes of a television show that aired during a single season, or all episodes of the television show that were produced. A media content collection may also be a collection of movies, such as all movies directed by a specific director. Media content collections are also not limited to visual media. A media content collection can be a musical album or a compilation of all songs produced by an artist. Furthermore, media assets and media content collections are not limited to media content that is stored and that can be played back repeatedly. A live broadcast of a future sporting event may be a media asset, while the collection of live broadcasts of all events of a tournament may be a media content collection.

The media assets of a media content collection all share a common characteristic that causes them to be part of a media content collection. This may include being episodes of the same show, starring the same actor/actress, having the same producer and/or director, being from the same genre, or being classified as belonging together in some other manner. The media assets may be innately part of the media content collections due to one of these shared characteristics (e.g., the episodes of the first season of a show are part of the show's first season) or may be part of the media content collection at the discretion of an entity or individual (e.g., a television critic generates a "best of" media content collection consisting of his or her favorite episodes of a show).

A media content collection can be accessed from a number of potential sources through a number of different content providers. A user may be able to purchase a DVD containing the media content collection, receive a password for accessing a website that streams the media content collection over the internet, purchase access to the media content collection for on-demand viewing via a set-top box, or download the media content collection to a personal computer. The different methods of receiving access to media content (e.g., downloading, streaming, playing physical merchandise) are referred to as types of access. The media assets that make up the media content collection can potentially also be accessed using a number of different types of access.

Content providers may provide access to a media content collection or individual media assets. Access to the media content collection and individual media assets may be provided free of charge, free of charge but requiring a subscription fee, or for a price. Multiple content providers may be capable of independently providing access to the same media content collection or media asset while charging different amounts for providing the access. A first content provider may charge $0.99 for downloading a movie, while a second content provider may charge $0.50 for providing access to the same movie. Different content providers may also provide access to media content collection and/or media assets through different types of access. The difference in price may or may not depend on the type of access provided by each content provider. For example, the first content provider may make the movie available for downloading for $0.99, while the second content provider and/or the first content provider may make the movie available for streaming over the Internet for $0.49.

Process 400 may receive access to a media content collection using a single transaction. This may involve a content provider selling the entire media content collection as a single item. This, in turn, may be reflected by the fact that the content provider is advertising the entire media content collection together, not allowing customers to purchase media assets of the media content collection individually, including a single item for the entire media content collection on receipts and invoices, and/or allowing a customer to purchase the entire media content collection by selecting a single option.

Process 400 may also receive access to the media content collection using multiple transactions. This may involve receiving access to each media asset of the media content collection separately, may involve multiple financial transactions, may require the customer to select each media asset individually for purchase, and/or each media asset purchased may have its own entry in a receipt or invoice. Furthermore, the multiple transactions may also be with multiple content providers of the media assets. For example, a first media asset is purchased from a first content provider using a first financial transaction, while a second media asset is purchased from a second content provider using a second financial transaction. Process 400 may also receive access to the different media assets through different approaches. For example, a first media asset can be downloaded from a first content provider, while a second media asset can be streamed through a second content provider.

In order to compare the price of receiving access to a media content collection using a single transaction with the price of receiving access to the media content collection using multiple transactions, process 400 first determines a price of receiving access to the media content collection using a single transaction at step 402. Process 400 may receive as input information identifying the media content collection as well as an associated content provider, or may only receive as input information identifying the media content collection. At step 402, if process 400 receives information identifying the media content collection and an associated content provider as input, process 400 may determine the price charged by the content provider for providing access to the media content collection using a single transaction. If process 400 receives only information identifying the media content collection as input, process 400 may further identify multiple content providers of the media content collection and determine the lowest price charged by one of these content providers for receiving access to the media content collection using a single transaction.

At step 404, process 400 determines the price for receiving access to a media asset of the media content collection. This may involve identifying one or more content providers of the media asset determining the price charged by each for providing access to the media asset, and determining the lowest price charged by one of these content providers for receiving access to the media asset. If process 400 receives information identifying the media content collection and an associated content provider as input, process 400 may also only consider the received content provider when determining the lowest price for receiving access to the media asset.

At step 406, process 400 determines if this was the last media asset of the media content collection. If not, process 400 repeats step 404 with the next media asset of the media content collection until process 400 has determined the lowest price for receiving access to each media asset of the media content collection.

At step 408, process 400 compares the price of receiving access to the media content collection using a single transaction with the price of receiving access to the media content collection using multiple transactions. Process 400 may accumulate the lowest prices determined in step 406 to calculate the price for receiving access to the media content collection using multiple transactions. Process 400 may also exclude media assets that the user already has access to or already owns (i.e., the media assets are accessible without a financial transaction) when accumulating the price for receiving access to the media content collection using multiple transactions. Alternatively, accumulating the lowest prices and/or excluding already available media assets may be performed at step 404. Process 400 then compares the price of receiving access to the media content collection using a single transaction with the price of receiving access to the media content collection using multiple transactions to determine which is lower, thereby determining the lowest overall price for receiving access to the media content collection.

At step 410, process 400 utilizes the result of the comparison of step 408. This may involve displaying a purchase opportunity for only the lower of the two options (i.e., displaying an option for receiving access to the media content collection using either a single transaction or multiple transactions, whichever is cheaper), displaying both options but highlighting the cheaper alternative, displaying a warning message if process 400 receives an indication that the user was about to purchase the more expensive option, or automatically performing the transactions required to receive access to the media content collection using the cheaper option.

Figure 5:
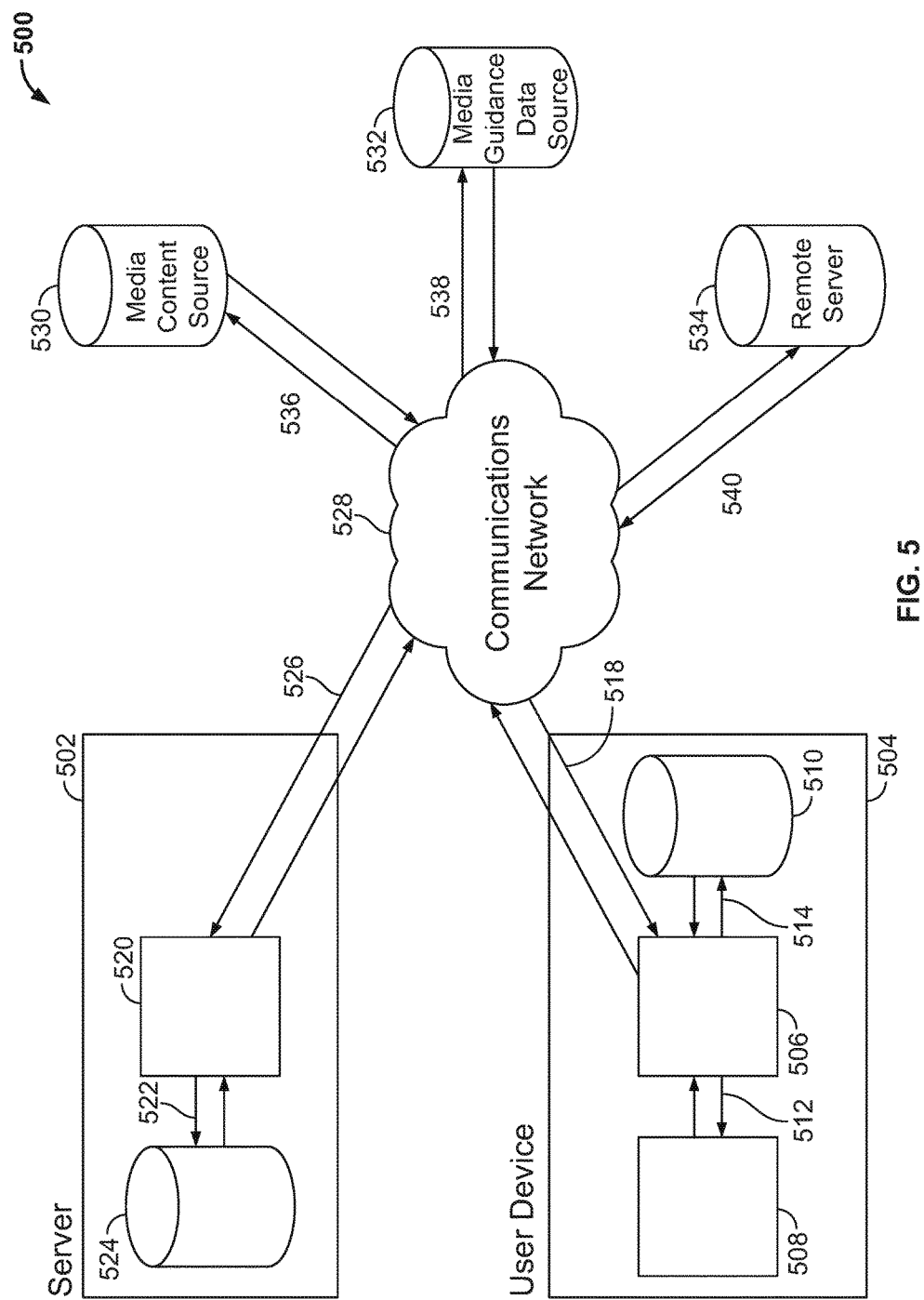
FIG. 5 is a diagram of an illustrative cross-platform interactive media system in accordance with some embodiments of the invention in accordance with some embodiments of the invention.

Process 400 of FIG. 4 can be implemented in system 500 of FIG. 5, in which case user equipment device 300 of FIG. 3 can be user device 504. User device 504 can, for example, be user television equipment, user computer equipment, a wireless user communications device, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment, user computer equipment, or a wireless user communications device. For example, user television equipment may, like some user computer equipment, be Internet-enabled allowing for access to Internet content, while user computer equipment may, like some television equipment, include a tuner allowing for access to television programming. The media guidance application may have the same layout on various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 500, there is typically more than one of each type of user equipment device but only one user device is shown in FIG. 5 to avoid overcomplicating the drawing. In addition, each user may utilize more than one type of user equipment device and also more than one of each type of user equipment device.

In some embodiments, a user equipment device may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings inputted by a user, as well as user activity monitored by the guidance application.

User device 504 may be coupled to communications network 528 via communications path 518. Communications network 528 may be one or more networks including the Internet, a mobile phone network, mobile voice or data network (e.g., a 4G or LTE network), cable network, public switched telephone network, or other types of communications network or combinations of communications networks. Path 518 may include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. For example, path 518 may be a wireless path or a wired path. Communications with user device 504 may be provided by one or more of these communications paths, but are shown as a single path in FIG. 5 to avoid overcomplicating the drawing. If multiple user devices are present in the system, different user device may communicate with communications network 528 using different paths.

Although multiple user devices and communications paths between such user devices are not drawn, multiple user devices may communicate directly with each other via communication paths, such as those described above in connection with path 518, as well as other short-range point-to-point communication paths, such as USB cables, IEEE 1394 cables, wireless paths (e.g., Bluetooth, infrared, IEEE 702-11x, etc.), or other short-range communication via wired or wireless paths. BLUETOOTH is a certification mark owned by Bluetooth SIG, INC. The user devices may also communicate with each other directly through an indirect path via communications network 528.

System 500 includes server 502, remote server 534, content source 530 and media guidance data source 532 coupled to communications network 528 via communication paths 526, 536, 538 and 540, respectively. Paths 526, 536, 538 and 540 may include any of the communication paths described above in connection with path 518. Communications with the server 502, the remote server 534, the content source 530 and media guidance data source 532 may be exchanged over one or more communications paths, but are shown as a single path in FIG. 5 to avoid overcomplicating the drawing. In addition, there may be more than one of each of server 502, remote server 534, content source 530 and media guidance data source 532, but only one of each is shown in FIG. 5 to avoid overcomplicating the drawing. (The different types of each of these sources are discussed below.) If desired, content source 530 and media guidance data source 532 may be integrated as one source device. Furthermore, server 502 may be the same as or a different server than media guidance data source 532. Although communications between server 502, remote server 534, content source 530 and media guidance data source 532 and user device 504 is shown as through communications network 528, in some embodiments, server 502, remote server 534, content source 530 and media guidance data source 532 may communicate directly with user device 604 via communication paths (not shown) such as those described above in connection with path 518.

One or more of the content providers discussed in relations to process 400 may be content source 530. Content source 530 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 530 may be the originator of content (e.g., a television broadcaster, a Webcast provider, etc.) or may not be the originator of content (e.g., an on-demand content provider, an Internet provider of content of broadcast programs for downloading, etc.). Content source 530 may include cable sources, satellite providers, on-demand providers, Internet providers, over-the-top content providers, or other providers of content. Content source 530 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 532 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 532 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 532 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 532 may provide user device 504 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 532) running on control circuitry of the remote server. When executed by control circuitry of the remote server (such as media guidance data source 532), the media guidance application may instruct the control circuitry to generate the guidance application displays and transmit the generated displays to the user equipment devices. The server application may instruct the control circuitry of the media guidance data source 532 to transmit data for storage on the user equipment. The client application may instruct control circuitry of the receiving user equipment to generate the guidance application displays.

Content and/or media guidance data delivered to user device 504 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Remote server 534 may be a $3^{rd}$ party server capable of providing other services. Remote server 534 may, for example, provide a search engine and/or a database of information. A search engine may perform a general search of information available via communications network 628, or may be a specific search engine for products, services and/or media content. Such a specific search engine may in fact be capable of performing some of the steps of process 400, such as determining the most cost-efficient way to receive access to a media content collection and/or media asset. Such a specific search engine may also be able to generate lists of content providers capable of providing access to media content or providers of physical merchandise. Remote server 534 may also host a database. Such a database may include information on media content collections and the media assets contained therein, or on providers of media content collection and/or media assets. The list of providers maintained by remote server 534 may contain only content providers that do not charge for the media content, content providers that do charge for the media content, or both. The database may also contain any further information discussed below as being stored in database 510, such as prices charged by content providers and/or types of access provided by content providers.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 528. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 530 to access content. Specifically, within a home, user device 504 may access the media guidance application to navigate among and locate desirable content. In this case user device 504 may be user television equipment or user computer equipment. Users may also access the media guidance application outside of the home using user device 504 to navigate among and locate desirable content. In this case user device 504 may be a user communications device.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 528. These cloud resources may include one or more content sources 530 and one or more media guidance data sources 532. In addition or in the alternative, the remote computing sites may include other user equipment devices, such as user device 504. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment or a wireless user communications device having content capture feature. Alternatively, the user can first transfer the content to a user equipment device, such as user computer equipment. The user equipment device storing the content uploads the content to the cloud using a data transmission service on communications network 528. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

User device 504 has implemented on it application 506 which can communicate with application 508 and database 510 through connections 512 and 514 respectively. Database 510 may be stored in storage 308. Server 502 has implemented on it application 520 which can communicate with database 524 through connection 522.

Application 506, application 508 and/or application 520 can be the media guidance application or a feature of the media guidance application. Application 506 and/or application 508 consist of instructions stored in storage 308 or received from media guidance data source 532 that, when executed by control circuitry 304, cause user device 504 to perform some or all the steps involved in the systems and methods described herein. Similarly, application 520 consists of instructions that, when executed by control circuitry found in server 502, cause server 502 to perform some or all the steps involved in the systems and methods described herein. Actions discussed herein as being performed by an application are understood to involve loading instructions of the corresponding application to registers of control circuitry 304 or other control circuitry and the control circuitry executing these instructions to cause user device 504 or server 502 to perform the action described therein.

The steps involved in process 400 can be executed by application 506, application 520, or a combination thereof. For example, application 506 may instruct control circuitry 304 to transmit a request containing information identifying a media content collection to application 520, application 520 may determine the lowest price for receiving access to the media content collection using a single transaction and the lowest price for receiving access to each of the media assets of the media content collection. Application 520 may then respond with this information, allowing application 506 to determine the overall lowest price for receiving access to the media content collection.

Application 506 may also interact with application 508 to execute process 400. Application 508 could, for example, be a web browser, the media guidance application, a shopping application or a display application. Furthermore, application 506 and/or application 508 can be widgets. Application 506 and application 508 can be two separate and distinct applications that are executed as separate processes and that can be independently activated. Application 506 and application 508 can also interact through an Application Program Interface (API). Furthermore, application 506 can be a feature of application 508, application 506 can be a plug-in for application 508, application 508 can be a feature of application 506, or application 508 can be a plug-in for application 506. Similarly, application 506 can be the same application as or a separate application from application 520.

Application 506 may interact with application 508 to receive a user selection of a media content collection and/or content provider of the media content collection. For example, a user may interact with application 508 to select a media asset or media content collection. Application 508 then sends this information to application 506, and application 506 executes process 400. Alternatively, application 506 may receive user input selecting a media asset or a media content collection directly, with application 506 executing process 400 in response. In either scenario, the result of process 400 can be provided to application 508 to generate a display based on this result, including selectable options for accessing the media content collection. Alternatively, such a display may be generated by application 506 directly. The interaction between application 508 and 506 may be transparent to the user (i.e., the user is not aware that two applications are exchanging information to perform process 400) or the display may noticeably change from displaying a user interface generated by application 508 to displaying a user interface generated by application 506.

Application 506 may also interact with application 508 to obtain information regarding media assets that can be accessed with or without a financial transaction. Media assets that can be accessed without a financial transaction include media assets that are available for free from a remote server, media assets that will be broadcast in the near future, media assets that are already owned by the user (e.g., media assets previously recorded on a DVR or media assets previously downloaded and stored on a hard drive), and media assets that are provided by services the user subscribes to (e.g., NETFLIX). For example, application 508 may be a media library management application that contains a list of all media assets stored on user device 504 and/or other devices owned by the user. Application 506 may communicate with such a media library management application to determine whether one or more media assets of a media content collection are already in the user's possession. As another example, application 508 may be the media guidance application. Application 506 may communicate with the media guidance application to determine whether one or more media assets of a media content collection will be broadcast or otherwise are (or will become in the near future) available.

Similarly, application 506 may communicate with application 508 to determine which services and/or content providers a user subscribes to or otherwise has access to. For example, application 508 may maintain information on content providers the user has accounts with (e.g., ITUNES STORE), content providers the user subscribes to (e.g., NETFLIX), or other accessible sources of media (e.g., the user's broadcast television provider). Furthermore, the very existence of certain applications may indicate one or more services and/or content providers a user subscribes to, has account with, and/or otherwise has access to. For example, if an ITUNES STORE application is installed on user device 504, the user presumably has an ITUNES STORE account and can purchase a media content collection or media assets from this content provider.

Application 506 may also interact with database 510 to execute process 400. Database 510 may store data structures for media content collections. These or other data structures may also identify the media assets that make up a media content collection. Database 510 may also store separate data structures for each media asset. These data structures may also contain information identifying content providers of the media content collection and/or associated media assets. Database 510 may contain data structures identifying potential content providers (i.e., known content providers that may or may not be able to provide access to a specific media content collection or media asset) and/or data structures identifying actual content providers (i.e., known content providers capable of providing access to a specific media content collection or media asset). These content provider data structures may also contain information regarding the type of access provided by each content provider and/or a price charged by the content provider for providing access to a media content collection or a media asset. The content provider data structures may also contain links (e.g., a hyperlink), addresses (e.g., an IP address) and/or other information that allows application 506 to contact, receive data from, or otherwise communicate with the corresponding content provider. These content provider data structures may be combined with the media data structures referred to above, or they may be two separate data structures. For example, database 510 may store a data structure for a media content collection that contains information regarding the media content collection, information identifying the media assets that make up the media content collection, and/or information identifying one or more content providers of the media content collection. Application 506 may retrieve, optionally based on information received from application 508 or previously retrieved from database 510, any one of the data structures referred to above to identify a media content collection, identify the individual media assets that make up the media content collection, identify a content provider of the media content collection, identify a content provider of a media asset, identify a potential content provider and/or identify the price for receiving access to a media content collection or a media asset. Following execution of process 400, application 506 may also utilize these or other data structures to determine how to access the media content collection or a media asset.

Instead, or in combination, application 506 may also communicate with one or more of remote server 534, content source 530 and media guidance data source 532 through communications network 528 to execute process 400. Application 506 may generate and transmit a search query in order to obtain necessary information. For example, application 506 may use information received from application 508 or database 510 identifying a media content collection or media asset to generate a search query requesting information regarding a media content collection, individual media assets of the media content collection, and/or content providers of the media content collection or media asset. This search query may be transmitted to remote server 534, which may be a general purpose search engine or a search engine specialized in searches for providers and/or pricing information (of media content or general) or content source 530, which may be a server associated with a potential or actual content provider. In response, application 506 may receive a data structure, document and/or file containing information identifying the media assets of a media content collection, information identifying content providers of the media content collection or media asset, information regarding the content providers ability to provide access to a media content collection or media asset, information regarding the type of access offered by the content providers and/or information regarding prices charged by the content providers. The received data structure, document and/or file may be a website or other information document. Application 506 then parses the received data structure, document and/or file to extract some or all of the information referred to above. The received data structure may also have a structure (e.g., set-width bit fields) or tags that allow application 506 to directly extract the information.

Application 506 may also communicate directly with one or more of remote servers 530-534 to determine any of the information referred to above. For example, application 506 may utilize data received from application 508, retrieved from database 510, received from remote server 534 and/or received from content source 530 to generate and transmit requests for information to remote server 534 and/or content source 530. As a more specific example, application 506 may retrieve a data structure stored in database 510 identifying content source 530 as a potential or actual content provider of a media content collection or media asset. Application 506 could then generate and transmit a request to content source 530 based on an address stored in the retrieved data structure and information identifying a media content collection. In response, application 506 could receive a data structure from content source 530 that includes information regarding whether content source 530 is capable of providing access to the media content collection or media asset, information regarding the type of access offered by the content provider, and/or the price charged by the content provider for providing access to the media content collection. The received data structure may be a website or other information document of the content provider which application 506 parses to extract some or all of the information referred to above. The received data structure may also have a structure (e.g., set-width bit fields) or tags that allow application 506 to directly extract the information.

As will be discussed further in reference to FIGS. 10-12, any combination of these approaches (receiving information from application 508, retrieving information from database 510, transmitting a search query and/or communicating directly with remote server 534 and/or content source 530) is possible. As an example, application 506 may receive information identifying a media content collection from application 508, and use this information to retrieve from database 510 a list of media assets that make up the media content collection. Using this list, application 506 could generate a search query for each of the media assets. In response to transmitting the search query to a search engine implemented on remote server 534, application 506 could receive a list of content providers of the media asset. Using this list of content providers, application 506 could retrieve from database 510 a data structure associated with each content provider identifying how to communicate with a remote server of the corresponding content provider, such as content source 530. Application 506 could then utilize these data structures to transmit requests identifying each of the media assets to each of the content providers' servers, and, in response, receive the price charged by each content provider for providing access to each media asset. Application 506 could use this information to accumulate the lowest price for receiving access to a media content collection using multiple transactions, and provide this information to application 508 for displaying. This is only an example of interactions that may occur between the different databases, devices, and applications present in system 500, and any number of steps referred to above may be skipped or further steps added.

Furthermore, some or all of the steps and/or information retrieval involved in executing process 400 may be performed by application 520 of server 502. Any information described above as being stored in database 510 can also be stored in database 524. Application 506 could then request the information from application 520, with application 520 retrieving the information from database 524 and transmitting it to application 506. Similarly, application 520 may interact with remote server 534, media guidance data source 532 and/or content source 530 through communications network 528 in the manner described above in reference to application 506 to retrieve information and transmit the information to application 506. Furthermore, any information received by application 506 from application 508 can be forwarded to application 520. Any number of steps of process 400 may be performed by application 520, with application 520 then transmitting the result of these steps to application 506 for further processing and/or for generating a display. For the sake of simplicity, the processes described herein will be presented as being performed by application 506. However, it is understood that any steps and/or actions performed by application 506 and/or application 508 can also be performed remotely by application 520, and vice versa.

Databases 510 and/or 524 can be populated once and never updated, periodically updated, continuously updated and/or updated based on events. Application 520 and/or application 506 can communicate with remote server 534, media guidance data source 532 and/or content source 530 to obtain updated information and can store this information in database 524 and 510, respectively. Application 506 and/or application 520 can also communicate with application 508, and database 510 and/or database 524 can be updated based on this communication. This updating may never occur, may occur periodically (e.g., every 24 hours), may occur continuously, or may be triggered by an event (e.g., a content source 530 pings server 504, new information and/or updated information is received as part of process 400, a user input is received at user device 504 or server 502, or server 502 triggers an updating function). Updating database 510 may also involve receiving information stored in database 524. For example, application 520 updates database 524 and either application 520 or application 506 triggers an update of database 510 which causes the updated information in database 524 to be downloaded to database 510.

Updating the database may involve adding further data structures and/or new information to database 510 and/or database 524. Any data structures discussed herein may be created and/or updated using these approaches. For example, information regarding a new media content collection and/or individual media asset may be added to either database by adding new data structures for this new media content collection and/or individual media asset. Similarly, a new data structure may be added for a new content provider. New content providers may also be discovered for specific media content collections and/or media assets, and information regarding content providers may be added to data structures associated with the corresponding media content collection and/or media asset. Application 520 and/or application 506 may become aware of this new information by automatically (either periodically or in response to an event) querying remote server 534, media guidance data source 532 and/or content source 530 or via user input. Updating may also involve altering existing data structures in database 510 and/or database 524. For example, prices charged by content provider and/or addresses/links associated with these content providers may be periodically and/or in response to events verified and/or updated.

Updating database 510 and/or 524 may also involve updating and/or adding data structures for media assets that are available free of charge. For example, application 520, application 506 and/or application 508 may periodically receive updated broadcast schedules or lists of media assets available free of charge for streaming. Such information may be received from media guidance data source 532, content source 530 and/or obtained using any of the methods described above. Database 510 and/or 524 may also store information regarding a user's media library, in which case database 510 and/or 524 may be updated to reflect the current content of the user's media library. For example, a user's media library may be spread out across multiple user devices. When a media asset is added to a user device other than user device 506, this information may be obtained by application 520 and forwarded to application 508 in order to update database 510.

Not all components described as part of system 500 must be present. For example, application 506 may be a fully stand-alone application, and it could encompass all features discussed in reference to application 508, thereby rendering application 508 unnecessary. Application 506 may also be able to perform process 400 without interacting with server 502 and/or database 510. On the other hand, application 506 may only provide a user interface, while all of process 400 is executed by application 520. For example, process 400 could be performed in its entirety by application 520, while application 506 is a web browser that just provides access to a website associated with server 502, and through which the user can interact with application 520.

Figure 6A:
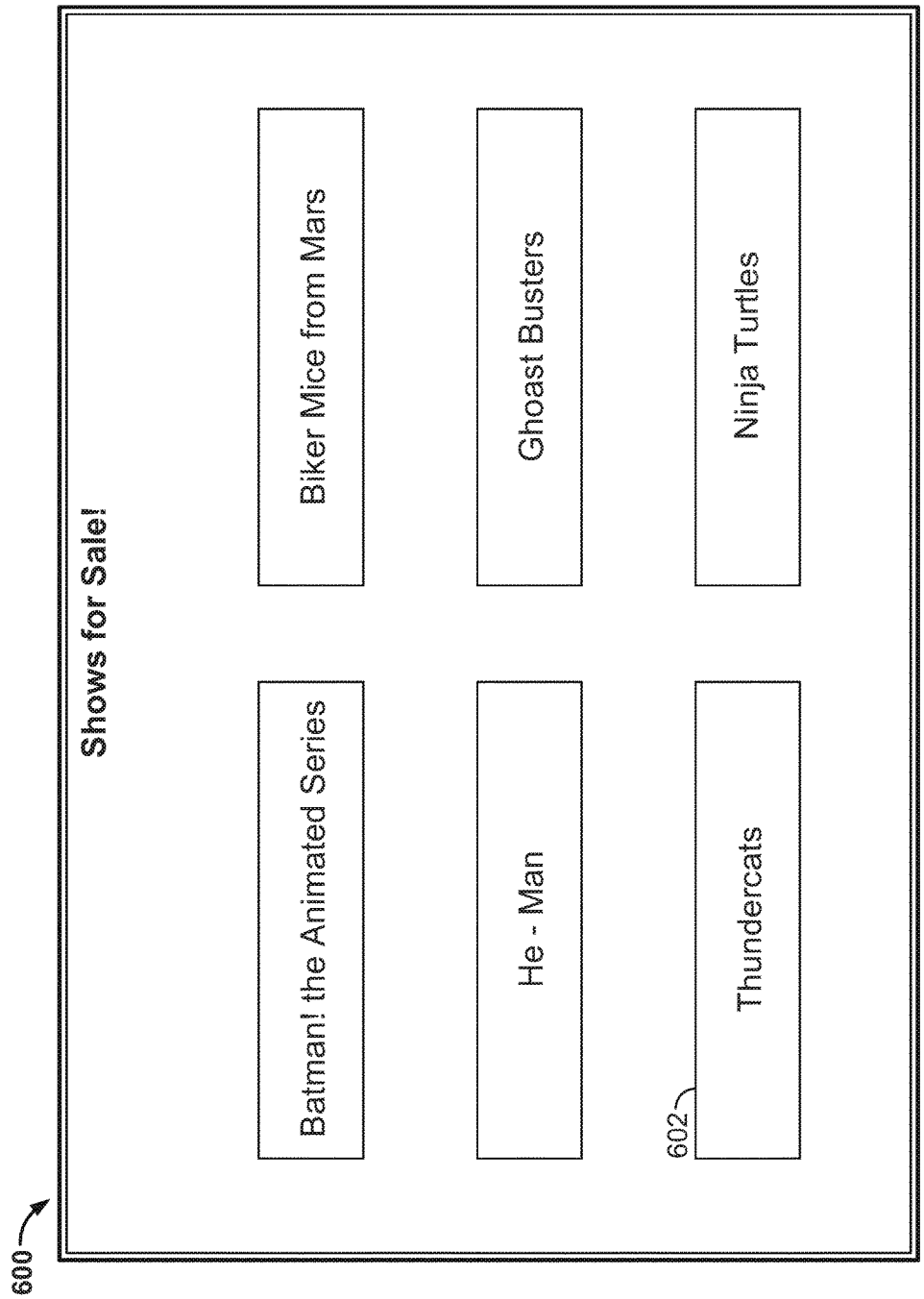
FIG. 6A and FIG. 6B show an illustrative user interface for offering access to a media content collection to a user in accordance with some embodiments of the invention.

FIG. 6A demonstrates exemplary user interface 600 involved in executing process 400 in system 500. User interface 600 may allow a user to select from a number of media content collections, including media content collection 602.

User interface 600 may be displayed on display 312 of user equipment device 300 in response to user input received through user input interface 310. User interface 600 may, for example, be presented as a feature of the media guidance application for accessing on-demand media or as an on-line store implemented on a website. User interface 600 may be generated by application 506, 508 and/or 520, and it may include options for accessing a number of different media content collections, including media content collection 602.

Figure 6B:
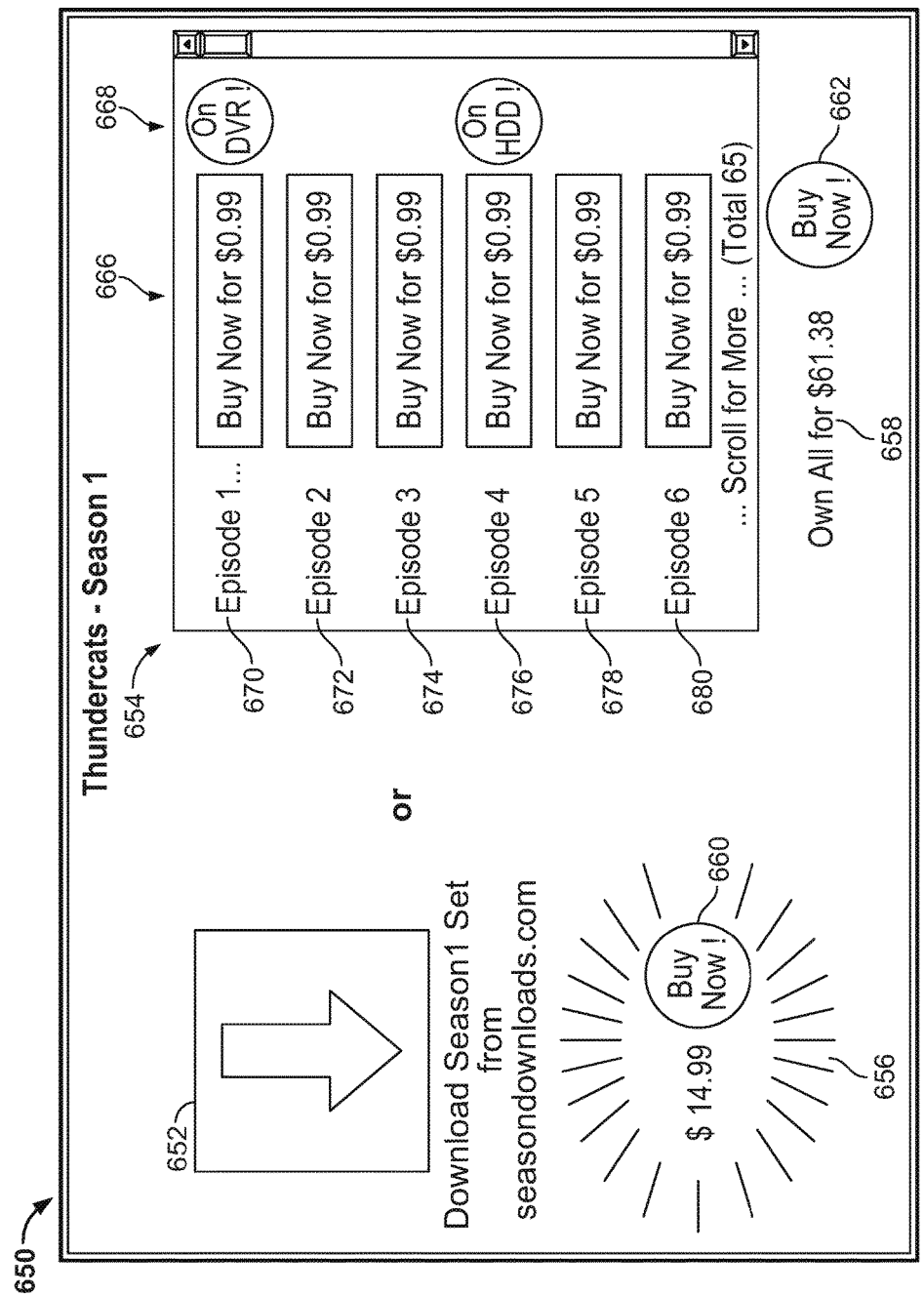

If a user selection of media content collection 602 is received, user interface 650 of FIG. 6B may be generated and displayed on display 312. User interface 650 includes options 660 in region 652 for purchasing media content collection 602 using a single transaction by downloading the entire media content collection and option 662 in region 654 for downloading individual media assets 670-680 of the media content collection using multiple transactions. The media assets presented in region 654 may also be purchased individually via options 666. Region 654 may also include information regarding media assets that are available without a transaction and their source via notifications 668. Furthermore, user interface 650 may indicate, based on the result of step 408 of process 400, whether it would be cheaper to receive access to the media content collection using a single transaction or multiple transactions by highlighting one of region 656 and 658.

User interface 650 presents a comparison between receiving access to media content collection 602 using a single transaction as displayed in region 652 or using multiple transactions as displayed in region 654. As an example, region 652 provides an option for purchasing the entire media content collection from a single content provider using a single financial transaction, while region 654 provides an option for purchasing individual media assets from potentially different content providers using multiple financial transactions. Region 652 is generated based on the result of step 402 of process 400, while region 654 is generated based on the result of step 404 of process 400.

Instead of receiving access to the entire media content collection, user interface 650 may also include options 666 for receiving access to individual media assets. Each of options 666 may be directed to the content provider of the media asset determined at step 404 of process 400 to charge the lowest price for providing access to the corresponding media asset.

Notifications 668 may provide information on whether it is possible to access one or more media assets of the media content collection without a financial transaction. In this example, media asset 670 has been previously recorded by a DVR, and can thus be accessed from the DVR without paying a content provider to receive access to the media asset. Media asset 676 has been downloaded to a hard drive of user device 504, or another user device in communication with user device 504, and can thus also be accessed without paying a content provider.

The fact that some of the media assets of the media content collection can be accessed free of charge is reflected in the price listed in region 658. This may be done by setting the price of the available media assets to zero, or by skipping those media assets when calculating the price for receiving access to the media content collection using multiple transactions. Alternatively, the price in region 658 may include the cost of purchasing media assets that are available without a financial transaction.

Figure 7A:
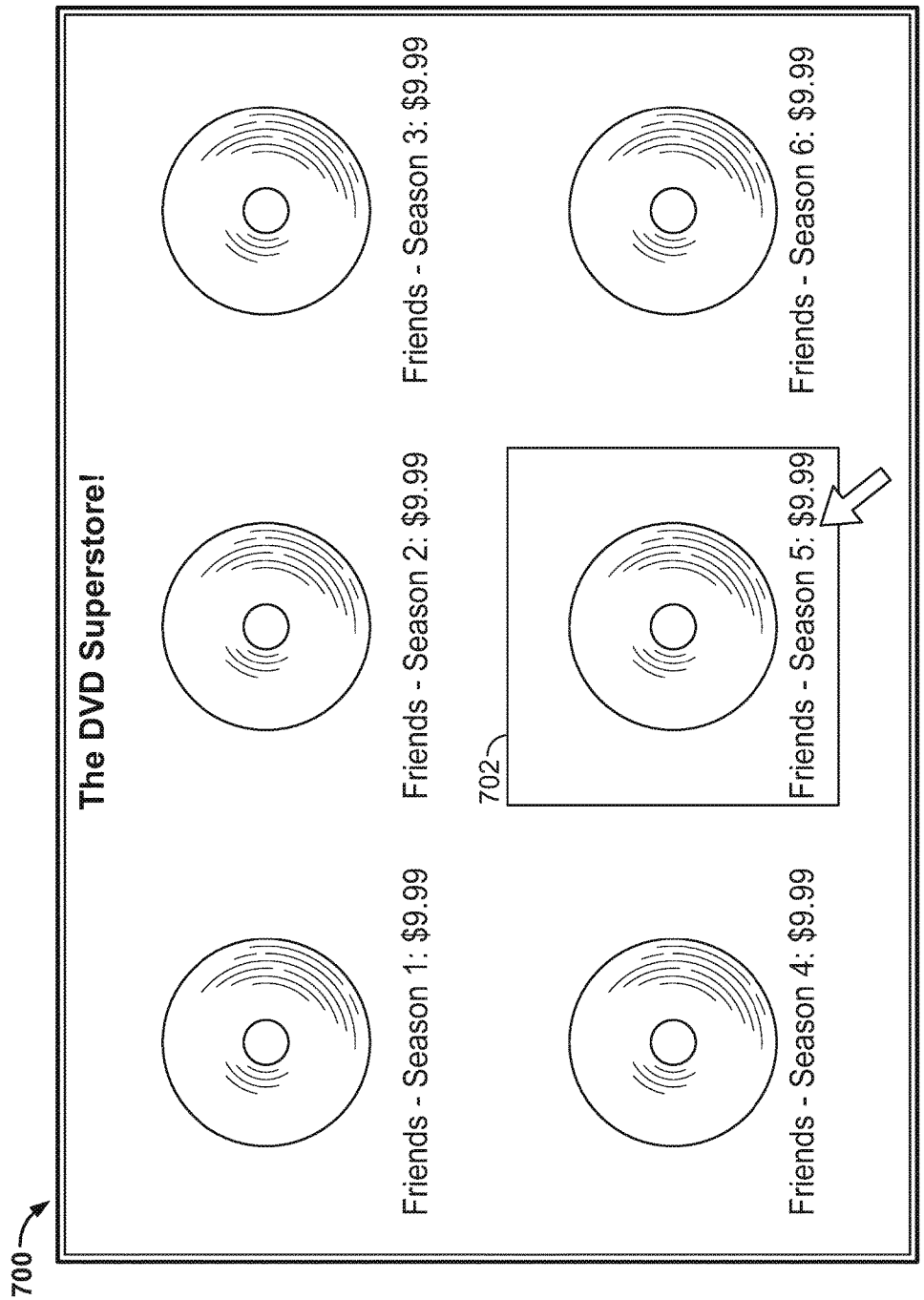
FIG. 7A and FIG. 7B show an illustrative user interface for providing a user with an alternative way of receiving access to a selected media content collection in accordance with some embodiments of the invention.

FIG. 7A demonstrates another exemplary user interface involved in executing process 400 in system 500. User interface 700 may be associated with a content provider of media content collections, including media content collection 702, and may be generated by application 508.

Figure 7B:
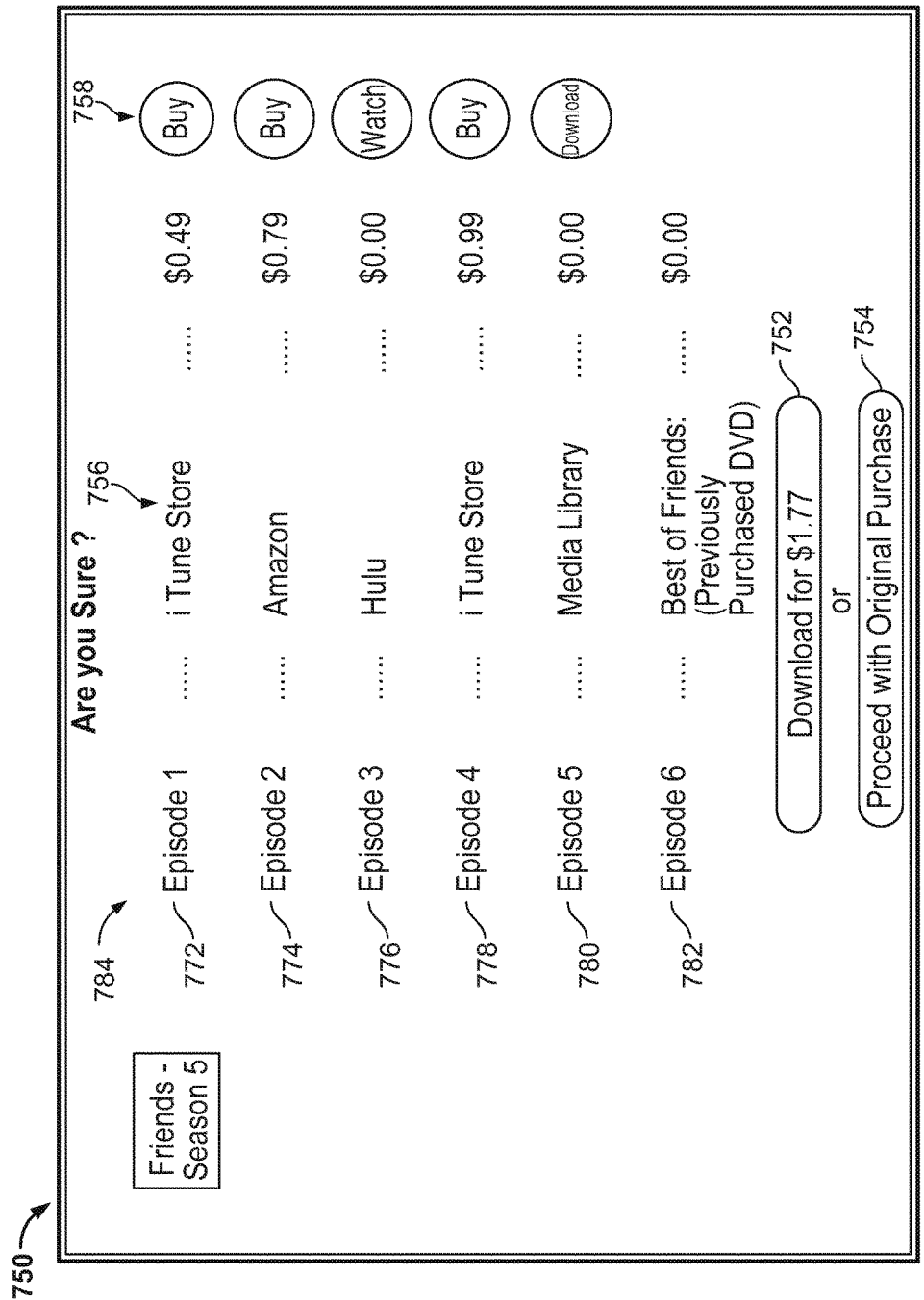

In response to receiving a user selection indicating a desire to purchase media content collection 702, application 506 may generate user interface 750 of FIG. 7B. User interface 750 includes region 784 which lists media assets 772-782. Individual media assets are available for purchase from content providers 756 for prices 756 through option 758. Furthermore, user interface 750 includes option 752 for receiving access to the entire media content collection using multiple transactions and option 754 for proceeding with the original selection and receiving access to the media content collection using a single transaction.

Application 506 may generate user interface 750 in response to the results of process 400. For example, when a user interaction with application 508 indicates a desire to receive access to a media content collection from a specific content provider using a single transaction, application 506 may execute process 400 to determine whether it would be more cost-efficient to receive access to the media content collection using multiple transactions. If it would be, application 506 displays user interface 750 as a pop-up to provide an alternative purchase opportunity. Within user interface 750, option 754 proceeds with the original purchase, while option 752 takes advantage of the lower price for receiving access to the media content collection using multiple transactions.

The multiple transactions may also involve different content providers. For example, the most cost-efficient way for receiving access to media asset 772 is through the ITUNES STORE, while the most cost-efficient way to receive access to media asset 774 is through AMAZON. Application 506 may also determine and/or display the most cost-efficient way to access each media asset through each available type of access. Application 506 may also determine and/or display the most cost-efficient way to access the media content collection using multiple transactions when each media asset is accessed through the same type of access and/or from the same content provider.

Region 784 reflects that application 508 may be able to receive access to a number of media assets without financial transactions. Media asset 776 is, for example, available free of charge through a free streaming content provider such as HULU. Instead of performing a financial transaction to buy this media asset, receiving a user selection of the corresponding option 758 would result in the streaming/displaying of media asset 776 free of charge. Furthermore, application 506 may interact with a media library application to determine that media asset 780 is already part of the user's media library. In this example, the user already owns media asset 780, but it is located on another device in communication with user device 504. In response to receiving a user selection of option 758 associated with media asset 780, application 506 downloads media asset 780 to user device 504 for viewing. Application 506 may also be aware of physical merchandise previously purchased by the user. This may occur if application 506 stores information regarding physical merchandise previously purchased through application 506 to database 510, by having application 506 communicate with another application or database, or by checking whether any such physical merchandise is currently present in a player in communication with user device 504. Based on this information, application 506 may determine that media asset 782 can be accessed free of charge from a DVD. The price listed in option 752 reflects that some of the media assets of the media content collection are available to the user free of charge.

Figure 8A:
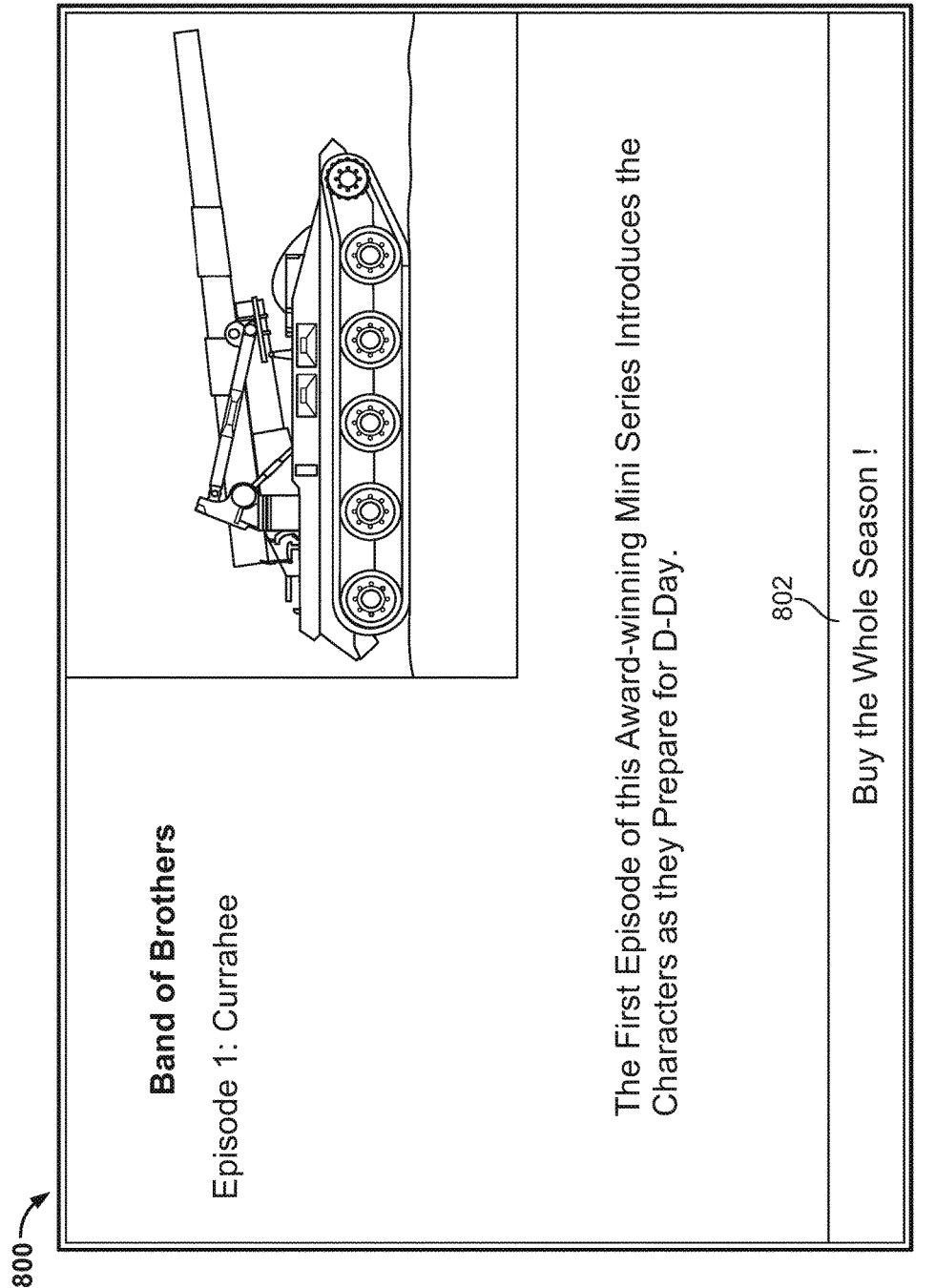
FIG. 8A and FIG. 8B show an illustrative user interface for offering to a user access to a media content collection associated with a selected media asset in accordance with some embodiments of the invention.

FIG. 8A demonstrates a third exemplary user interface involved in executing process 400 in system 500. In this example, application 506 is a feature of the media guidance application, and application 506 and application 508 are thus the same application: the media guidance application. User interface 800 may be generated by the media guidance application in response to receiving a user request for further information regarding a media asset (in this example, a television program). Besides providing information on the media asset, user interface 800 also includes option 802 for receiving access to a media content collection the media asset is a part of.

Figure 8B:
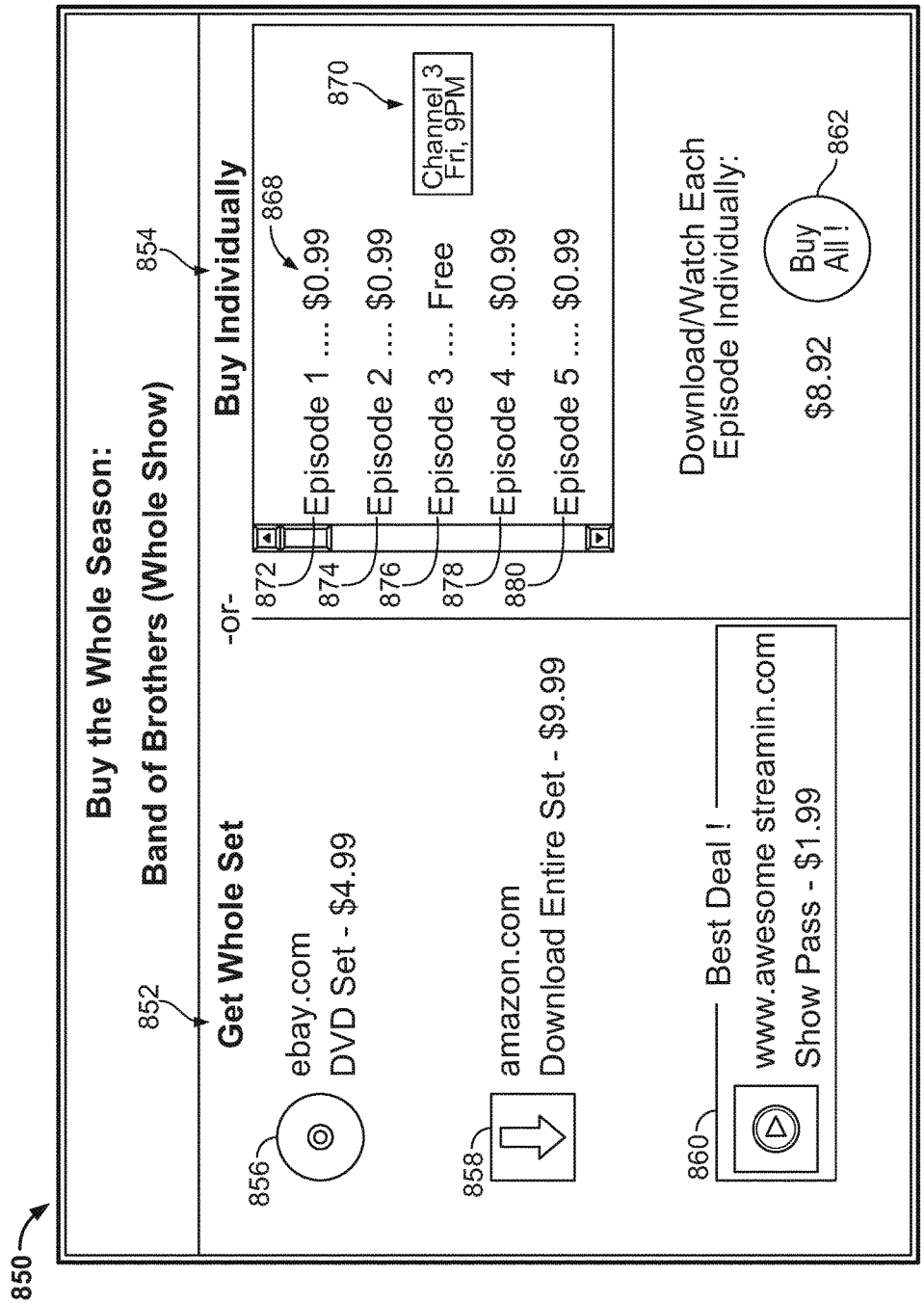
Figure 9:
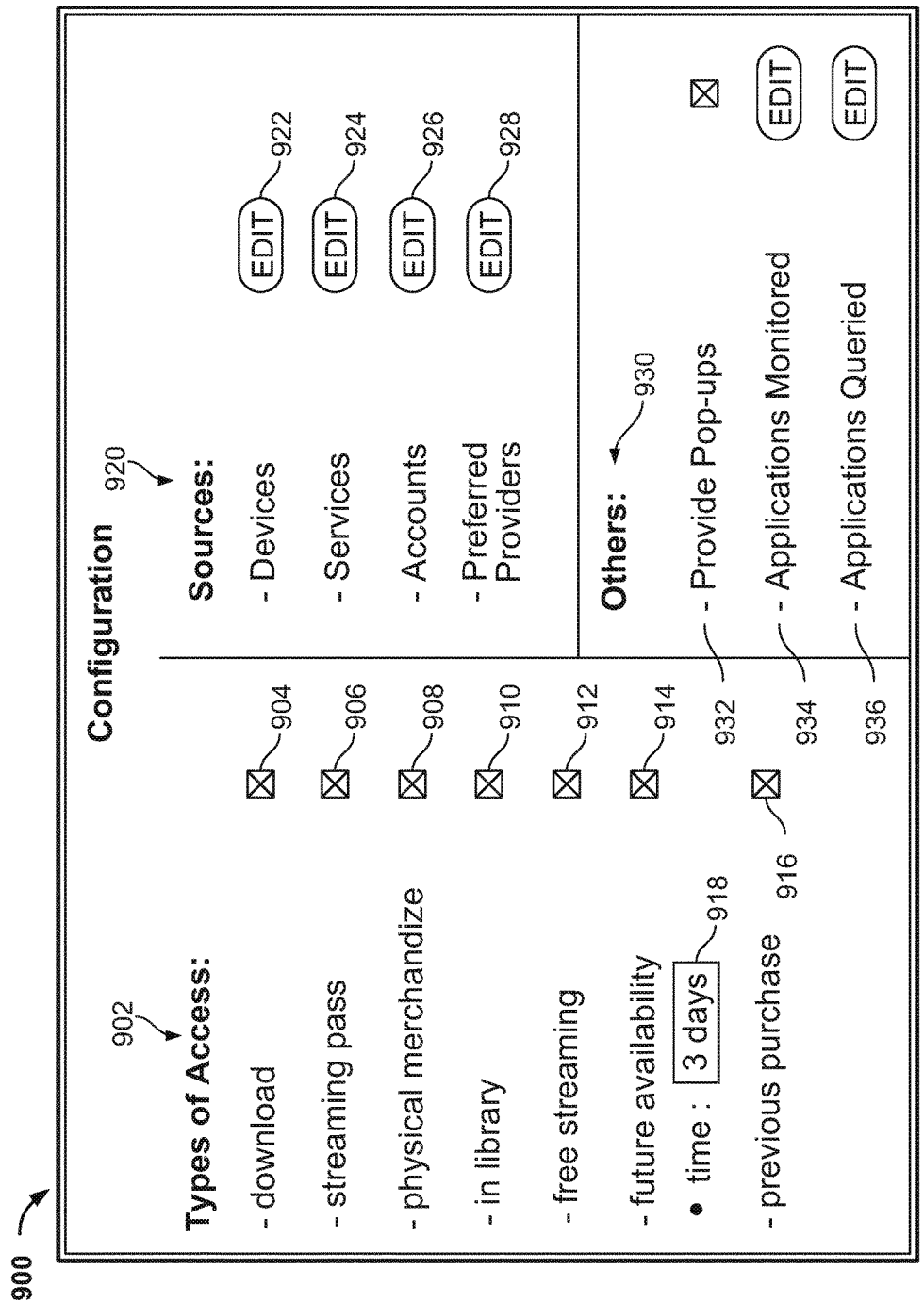
FIG. 9 shows an illustrative configuration interface for receiving inputted user preferences in accordance with some embodiments of the invention.

In response to receiving a user selection of option 802, application 506 generates user interface 850 of FIG. 8B. User interface 850 includes options 856-860 in region 852 for receiving access to a media content collection using a single transaction and option 862 in region 854 for receiving access to the media content collection using multiple transactions. User interface 850 also includes options 870 for receiving access to individual media assets 872-880 for prices 868.

User interface 850 may include multiple options for receiving access to the media content collection using a single transaction. Each of options 856-860 may be the lowest price charged by a content provider of the media content collection for accessing the media content collection using a particular type of access. In this example, user interface 850 includes option 856 for purchasing physical merchandise containing the media content collection, option 858 for downloading digital files with the media content collection, and option 860 for streaming the media content collection. However, application 506 may still indicate the most cost-efficient way to receive access to the media content collection, regardless of type of access, such as by highlighting the cheapest option. In this example, option 860 is labeled as "Best Deal!", since it is the most cost-efficient way of receiving access to the media content collection, whether using a single transaction or using multiple transactions.

Application 506 may also take into account what media assets will become available for access without a transaction in the future. In this example, option 870 may indicate that media asset 876 will be broadcast in the near future, and that it is possible to view and/or record media asset 876 at that time free of charge. If a user selection of option 870 of media asset 876 is received, application 506 may program a DVR to automatically record media asset 876 when it is broadcast. Alternatively, application 506 may determine whether media asset 876 is scheduled to be broadcast at the current time or in the near future, and, in response to receiving a user selection of option 870, tune to the corresponding channel. The same applies to media assets that are currently not available free on-demand or through streaming, but will be so in the near future. In some embodiments, application 506 also considers media assets or media content collection that are currently not available for purchase from a content provider, but that will be in the near future.

Application 506 may also determine the cost of receiving access to an individual media asset or the media content collection at a future point in time. For example, application 506 may display another option, similar to option 862, informing the user that the media content collection can be obtained at a future point in time at a lower price. Such further options may be displayed only if the future price is lower than the current price, or under all circumstance. For example, region 854 may indicate that the media content collection can be accessed for $8.92 this instant, for $7.93 tomorrow, or for $1.98 in three weeks. The change in price may be due to media assets becoming available for a cheaper price in the future, due to media assets becoming available on-demand for no charge, or media assets being scheduled for broadcast in the intervening time period. If a user selection of an option to receive access to the media content collection at a future date for a lower price is received, application 506 may program itself or another application to automatically record or download and store any media assets that become available free of charge or at a lower price in the intervening time period.

The generation of user interfaces 650, 750 and 850 may be influenced by the user preferences stored in database 510 and/or database 524. These user preferences may, in turn, be based on user input received through configuration interface 900 of FIG. 9. Configuration interface 900 includes options 904-916 associated with different types of access 902. Some types of access, such as the type of access associated with option 914, may have further options, such as option 918. Configuration interface 900 also includes lists 922-928 of sources 920, which may be altered based on received user impute. Other options 930 include option 932 and lists 934-936.

Which of options 904-916 is selected amongst type of access 902 dictates what types of access are considered when determining prices for receiving access to a media content collection or a media asset. For example, if option 904 corresponding to accessing media content by downloading media content is unchecked, content providers of downloadable media content will not be considered when determining the lowest price for receiving access to a media asset. Option 906 is associated with paid services that allow for streaming of media content, option 908 is associated with purchasing physical merchandise containing media content, option 910 is associated with media content already available through the user's media library, option 912 is associated with media content that can be streamed free of charge through a network connection, option 914 is associated with media content that will become available in the future, and option 916 is associated with media content previously purchased by the user, including previously purchased physical merchandise. When application 506 is determining the lowest prices for a media content collection or an individual media asset, application 506 may only consider content providers that provide access to the media content collection or the individual media asset via types of access whose corresponding options are selected in configuration interface 900.

Further levels of customization of application 506 are also possible. Instead of including only options for the addition or removal of the types of access to be considered by process 400, configuration interface 900 may also include options for ranking the different types of access. Such ranking can be used by application 506 to determine which content provider to recommend when faced with two identical and/or similar prices for receiving access to media content through two different types of access. In fact, configuration interface 900 may even include options for specifying how much extra the user is willing to spend in order to receive access to media content through a particular type of access compared to another type of access, or for receiving access to all media assets of the media content collection using the same type of access.

Furthermore, the value received as input for option 918 indicates how long into the future application 506 should look when determining whether a media content collection or a media asset will become accessible free of charge in the future. In this example, if a media asset is to be broadcast or otherwise made available with or without a transaction within 3 days, application 506 will include it when determining the lowest price for receiving access to the media content collection using multiple transactions. Conversely, if a media asset is to be broadcast or otherwise made available only after 3 days, application 506 will not include it when determining the lowest price for receiving access to the media content collection using multiple transactions.

Sources 920 includes lists of sources of media content that are to be considered by process 400, and allows a user to edit these lists. Devices 922 lists which devices connected to user device 504 application 506 should query when determining whether a media asset of a requested media content collection can be accessed without a transaction. Services 924 lists content providers subscribed to by the user. This includes the type of broadcast television received by the user, paid content providers (e.g., HULU PLUS and NETFLIX), and other services that charge a user an access fee but do not necessarily charge for accessing individual media assets and/or require a user account to be created. Application 506 may communicate with these content providers to determine which further media assets can be accessed without a transaction. Accounts 926 lists services that a user has an account for but that potentially do not provide free access to individual media assets. A user may enter, for example, an ITUNES or an AMAZON account into this list. Application 506 may consider these content providers when executing process 400. Accounts 926 may be in lieu of or in combination with other content providers considered by application 506. Finally, preferred content providers 928 lists the content providers of media content that the user prefers. Application 906 may give these content providers an advantage, may only consider these content providers, or may append these content providers to any list of potential and/or actual content providers when determining executing process 400.

Information contained in sources 920 may be used to populate database 510 or database 524. For example, the data structures for potential and/or actual content providers may be generated based on any of the lists presented under sources 920. Furthermore, lists present under sources 920 may be used to filter lists of content providers generated by application 506 in order to contain only content providers listed in sources 920.

Configuration interface 900 may also include other options 930. If option 932 is checked, application 506 has permission to generate a pop-up when it receives a user input indicating a desire to purchase a media content collection using a single transaction and process 400 determines that it would be cheaper to receive access to the media content collection using multiple transactions. As an example, if option 932 were not selected, user interface 750 would not be displayed in response to a user selection of media content collection 702 of user interface 700.

List 934 lists other applications, such as application 508, that are to be monitored by application 506 for providing opportunities for receiving access to a media content application using a single or multiple transactions. This may include applications that are to be monitored for providing pop-ups when the user indicates a desire to purchase a media content collection, as was demonstrated with user interfaces 700 and 750, or applications that relate to media assets or media content collections and for which it may be desirable to embed links to purchase opportunities, as was demonstrated with user interfaces 800 and 850.

List 936 lists applications that application 506 is to communicate with to determine which media assets can be accessed without a financial transaction (e.g., application 506 may query a media library management application to determine whether a media asset is already in a user's possession or query the media guidance application to determine which media assets will become available via broadcast television or on-demand in the future), to determine which content providers are to be queried for a media asset or media content collection, and/or to determine which other sources of media content the user has access to. An application added to list 936 may be queried to populate and/or update a list present in sources 920.

Any number of the options described above may also be automatically set. For example, application 506 may query a network to determine which other devices are present on the network and to obtain information on media content stored on these devices. Similarly, application 506 may interact with user device 504 and any background processes or other applications implemented thereon to determine which other applications are installed on user device 504. Based on this information, and based on information retrieved regarding these other applications, application 506 may populate lists 934 and 936.

Figure 10:
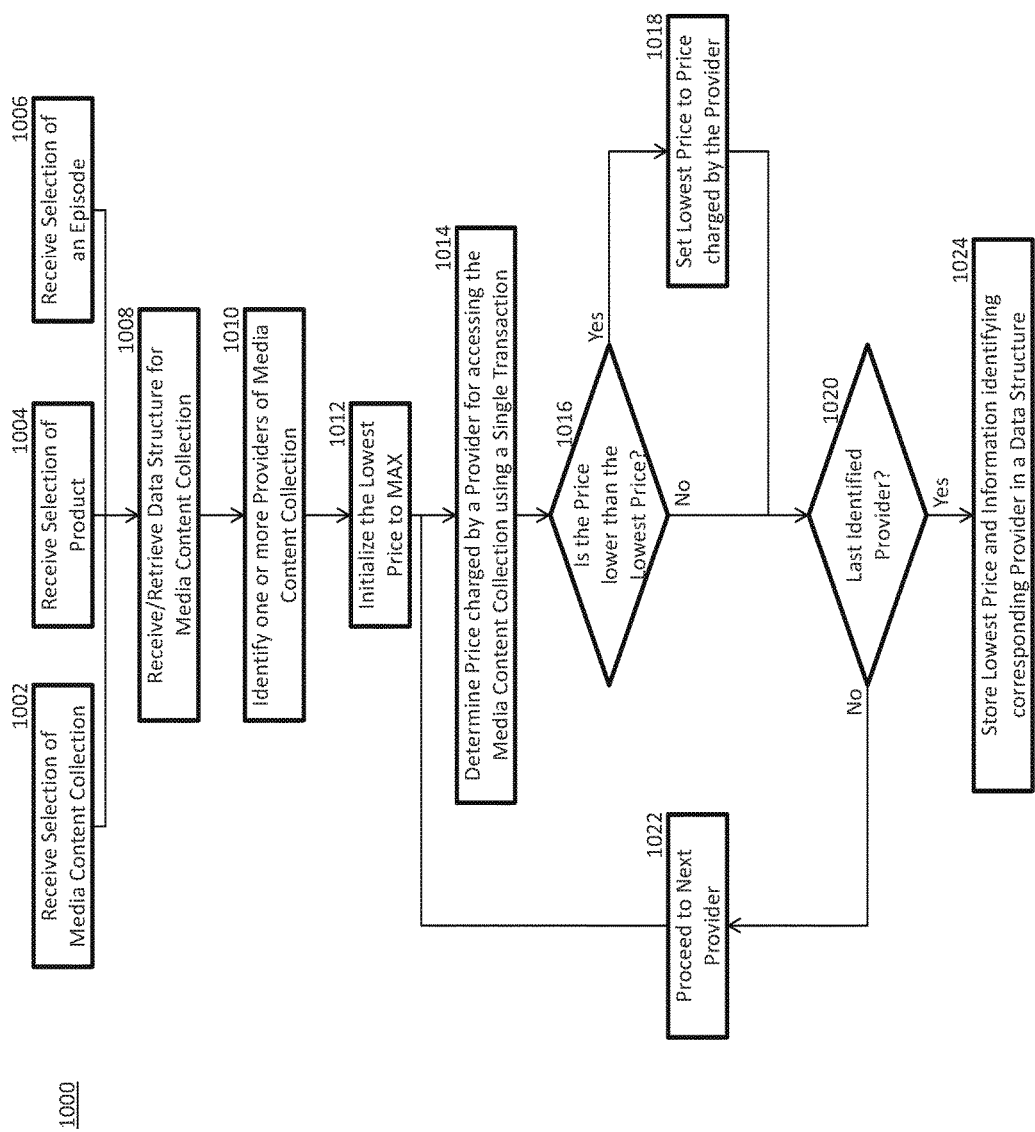
FIG. 10 is a flowchart of a process for determining a price for accessing a media content collection using a single transaction in accordance with some embodiments of the invention.
Figure 11:
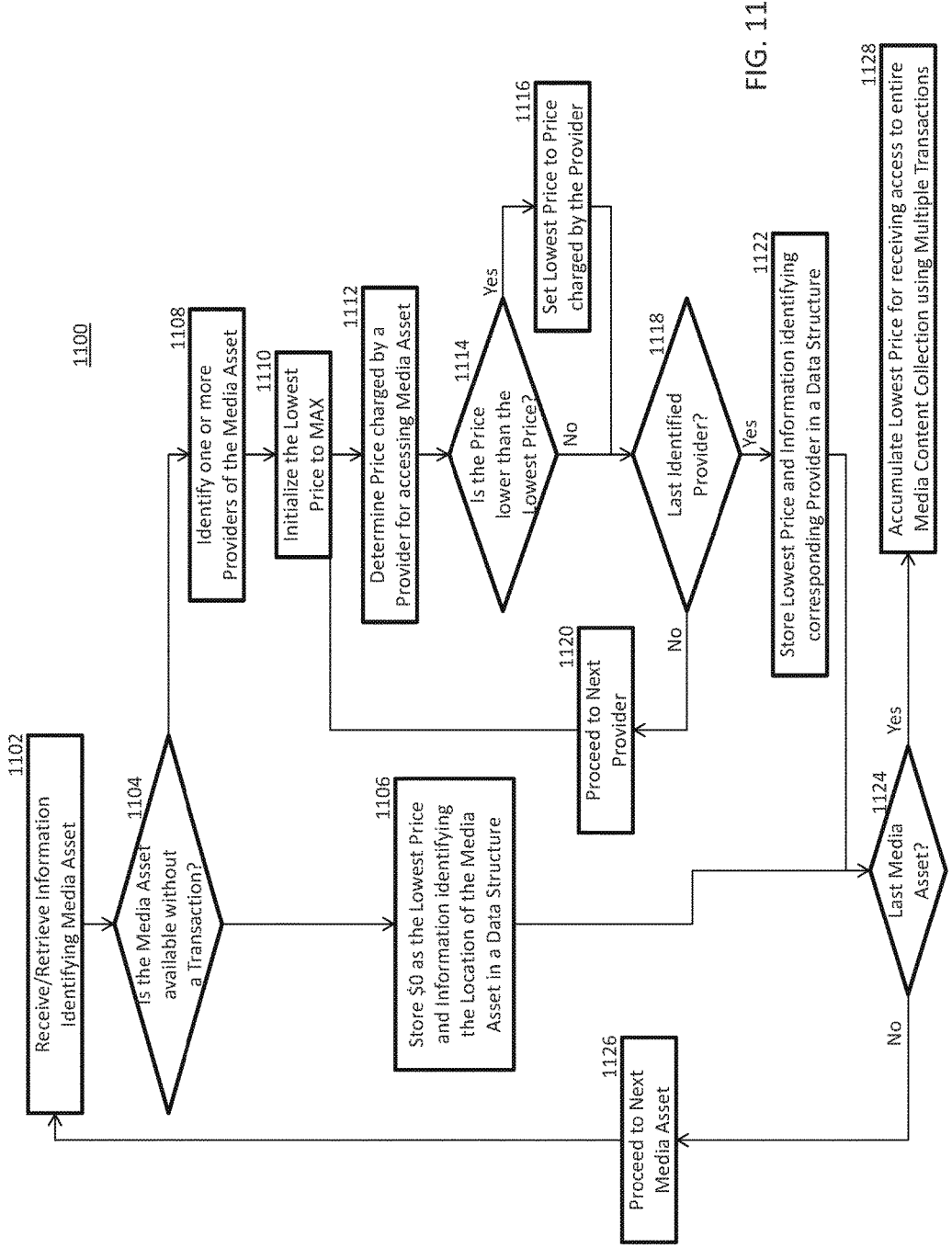
FIG. 11 is a flowchart of a process for determining a price for accessing a media content collection using multiple transactions in accordance with some embodiments of the invention.
Figure 12:
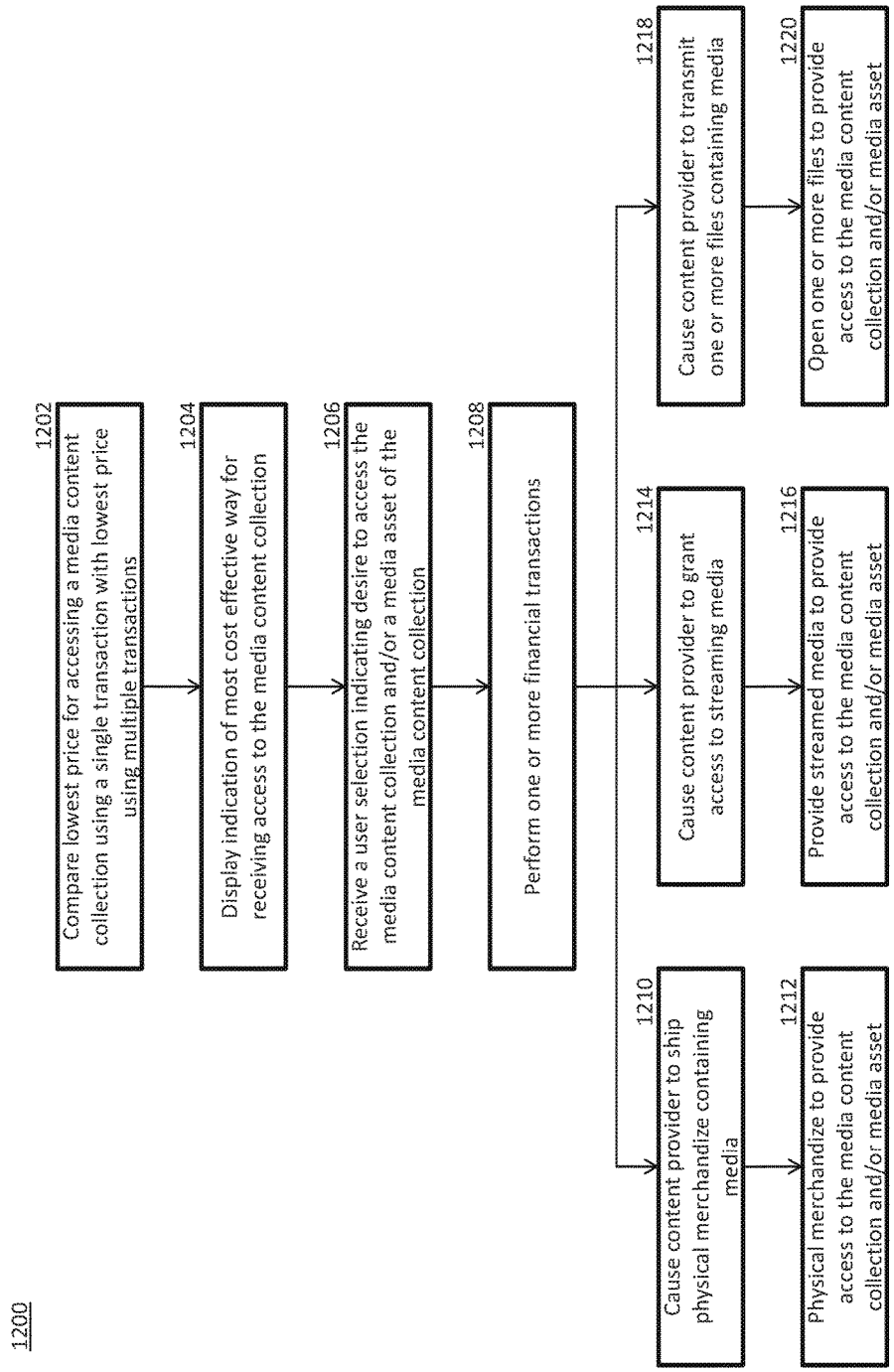
FIG. 12 is a flowchart of a process for accessing a media content collection in accordance with some embodiments of the invention.

FIGS. 10-12 illustrate steps of process 400 in greater detail.

FIG. 10 is a flow chart of process 1000 which illustrates in greater detail the steps involved in executing step 402 of process 400.

At steps 1002-1006, application 506 receives a user selection associated with a media content collection. This selection may be received through user input interface 310 or from application 508. Application 506 may receive a selection of a media content collection, such as in step 1002. Application 506 may also receive a user selection of a product containing a media content collection, such as in step 1004. Such a product may, for example, be physical merchandise containing the media content collection or a request to download the media content collection from a particular content provider. Application 506 may also receive a user selection of a media asset of the media content collection, such as in step 1006.

Based on the received user selection, application 506 may receive and/or retrieve a data structure for the media content collection at step 1008. This data structure may be received from application 508, retrieved from database 510, received from server 502, received from content source 530 and/or received from remote server 534. For example, if application 506 is a plug-in for application 508, application 506 may receive the data structure from application 508 when the user selects an option displayed within a user interface of application 508 that is associated with application 506. Similarly, application 508 may pass the data structure to application 506 through an API. User selectable options for receiving access to a media content collection may also be associated with data structures in database 510. Thus, when application 506 receives a user selection of one of these options, it may be able to directly retrieve the data structure for the corresponding media content collection from database 510.

Application 506 may also receive only limited information from user input or application 508, and use this limited information to retrieve a data structure for the media content collection from remote server 534, content source 530 or database 510. For example, application 506 may receive only a name (full or shortened) or other identification information for the media content collection and/or a single media asset of the media content collection, and utilize this information to locate a data structure stored in database 510 for the media content collection. Application 506 may also use such information to generate a request and/or search query, and may transmit this request and/or search query to remote server 534 or content source 530. In response, application 506 may receive a data structure for the media content collection from remote server 534 or content source 530. As an example, if application 506 or application 508 receives a user selection of a product containing a media content collection, application 506 may receive a data structure for the media content collection from a remote server associated with the content provider of the selected product, such as content source 530.

The data structure received/retrieved at step 1008 may include further information that identifies the media content collection, whether the media content collection can be accessed without a transaction, potential or actual content providers, one or more prices for receiving access to the media content collection using a single transaction, types of access available for receiving access to the media content collection and/or a list of media assets that make up the media content collection. The content of the data structure may depend upon how and from where the data structure has been retrieved. For example, a data structure received from application 508 may contain only information identifying the media content collection, a data structure retrieved from database 510 may further include a list of the media assets of the media content collection, and a data structure received from remote server 534 or content source 530 may even further include a price charged by a content provider for providing access to the media content collection.

At step 1008, application 506 may also determine whether the retrieved/received data structure contains enough information to execute the remainder of process 400. In this case, if application 506 determines that prerequisite information is not present, application 506 may retrieve and/or receive a second data structure using any of the methods described above to supplement the original data structure.

At step 1010, application 506 may identify one or more content providers of the media content collection and generate a list of content providers. This identification may be performed based on the data structure for the media content collection. For example, application 506 may utilize data found in the data structure (e.g., information identifying the media content collection) to generate a search query or request and transmit the search query or request to remote server 534 or content source 530. In response, remote server 534 or content source 530 may transmit information regarding content providers capable of providing access to the media content collection using a single transaction. Application 506 may also utilize the data structure to retrieve information regarding content providers of the media content collection from database 510. The data structure retrieved/received at step 1008 may also itself contain such information.

Application 506 can also execute step 1010 without utilizing the data structure. Application 506 may, for example, retrieve a data structure from database 510, remote server 534 or content source 530 identifying potential content providers, and then communicate with each potential content provider at this or a later stage (e.g., as part of step 1014) to determine whether the potential content provider is actually capable of providing access to the media content collection.

Furthermore, application 506 may utilize information found in the data structure to identify a single content provider of the media content collection. For example, if the user selects a product containing the media content collection, the only content provider for providing access to the media content collection using a single transaction considered by process 400 and process 1000 may be the content provider of that product.

Once application 506 has received information regarding content providers of the media content collection, application 506 may use this information to generate a list of content providers. This may involve parsing a document (e.g., a mark-up document of a website), extracting information from a data structure, and/or copying the received/retrieved information.

Application 506 may also filter the list of identified content providers of the media content collection based on user preferences entered into the configuration interface. Data associated with the content provider, such as data retrieved from database 510 or data received from a remote server associated with the content provider, such as content source 530, may indicate what type of access the content provider provides. Content providers of a type of access that the user has indicated is not desirable may be removed from the list or never added to it in the first place. Furthermore, the list of content providers may be filtered and/or generated based on the lists presented under sources 920. For example, application 506 may only add content providers listed in list 928 (i.e., "Preferred Provider") to the list, or may supplement the list with content providers listed in list 924 (i.e., "Services") and/or list 926 (i.e., "Accounts").

At step 1012, application 506 sets the lowest price for receiving access to the media content collection using a single transaction to a MAX value (e.g., the maximum value capable of being stored to a variable holding the lowest price). Alternatively, application 506 sets the price charged by the first content provider in the identified list as the initial lowest price. Setting the lowest price may involve storing the value to a register or variable in the address space of application 506. Alternatively or in combination, application 506 may also store and maintain a pointer (or other data identifying a content provider) to the content provider charging the lowest price. Initially this pointer may be set to NULL or to the first content provider of the identified list of content providers.

At step 1014, application 506 determines a price charged by a first content provider of the identified list for providing access to the media content collection using a single transaction. Application 506 may retrieve this price from the data structure for the media content collection, from another data structure in database 510 that is associated with the content provider, from a remote server associated with the content provider, such as content source 530, or from remote server 534. The price charged by each content provider may also have been added to the list of content providers as part of the process for generating the list. If not, this information may be added to the list or another data structure associated therewith. The prices charged by different content providers may also be determined using different approaches. For example, database 510 may store the price charged by a first content provider but not a second content provider. In this case, application 506 may retrieve the price charged by the first content provider from database 510, and interact with a remote server associated with the second content provider to determine the price charged by the second content provider. Furthermore, if the price is retrieved from database 510, application 506 may determine when this price was previously stored to database 510. If some time has passed since then, application 506 may determine the price using a second approach. Application 506 may also store the price determined using the second approach to database 510, thereby updating the information found in database 510.

At step 1016, application 506 determines whether the price charged by the content provider is lower than the lowest price. If it is, the lowest price is set at step 1018 to the price charged by the content provider. This may involve overwriting a variable of the memory space of application 506 to contain the new lowest price and/or overwriting a pointer (or other data identifying a content provider) to point to the content provider charging the new lowest price.

At step 1020, application 506 determines whether the content provider is the last content provider in the identified list. If it is not, application 506 proceeds to the next content provider in the list, and steps 1014-1020 are repeated.

At step 1024, application 506 stores the lowest price charged by a content provider of the media content collection and information identifying the corresponding content provider to a data structure. The information identifying the corresponding content provider may include a network address through which access to the media content collection can be obtained, user readable information such as the content provider's name, information identifying another application through which access can be received and/or other user or computer readable information. Storing the information to the data structure may involve generating a new data structure based on this information, inserting new information into an existing data structure, setting a link to point to an existing data structure and/or copying the content of another data structure.

FIG. 11 is a flow chart of process 1100 which illustrates in greater detail the steps involved in executing step 404 of process 400.

At step 1102, application 506 retrieves or receives information identifying each media asset of the media content collection. This information may be received from application 508, retrieved from database 510, received from server 502, received from remote server 534, received from content source 530, extracted from the data structure for the media content collection that was retrieved in step 1008, and/or received using one of the techniques discussed above in relations to step 1008. Furthermore, combinations of these approaches are also possible. For example, application 506 may extract some information from the data structure for the media content collection that was retrieved in step 1008, and then utilize one of the techniques discussed above in relation to step 1008 to retrieve or receive a data structure for the media asset.

The execution of step 1102 may differ for different media assets of the media content collection. For example, when processing the first media asset of the media content collection, application 506 may generate and transmit a request or search query based on the data structure for the media content collection and, in response, receive another data structure containing information on one or more media assets of the media content collection. Application 506 may then utilize this data structure to obtain information on subsequent media assets.

At step 1104, application 506 determines whether the media asset can be accessed without a financial transaction. This may involve determining whether the media asset is part of the user's media library, whether the media asset is available for streaming or download from a content provider the user subscribes to or that is free of charge, whether a file and/or physical merchandise containing the media asset is currently in the user's possession, whether a file containing the media asset is stored in a device accessible by user device 504 via a network, and/or whether the media asset will become available through a broadcast, for streaming, or for downloading in the near future. The determination of step 1104 may be based on user preferences inputted through configuration interface 900. For example, application 506 may consider only media assets accessible through particular types of access, and may not consider receiving free access to a media asset if this free access is not available until after a certain future time. The determination of step 1104 may also involve generating and transmitting a search query in order to determine whether one or more remote servers, such as content source 530, can provide access to the media asset without a financial transaction (including services listed in list 924), requesting such information from application 508 (including applications listed in list 934) or server 502, retrieving the information from database 510, and/or communicating with one or more other devices (e.g., devices listed in list 922).

If, at step 1104, application 506 determines that the media asset is or will be available without a transaction, application 506, at step 1106, stores $0.00 as the lowest price for receiving access to the media asset to a data structure. Alternatively, if application 506 accumulates a lowest price for accessing a media content collection using multiple transactions while each media asset is being processed, application 506 may instead, or in combination, skip the accumulation step. Application 506 may also store information identifying how to access the media asset without a financial transaction to the data structure. This information may include the type of access that can be obtained, and, as appropriate, an address or other location information. The information may also include timing information (i.e., when the media asset will become available without a transaction), such as a scheduled broadcast date and time. Furthermore, application 506 may still proceed with steps 1108-1122 even if a media asset can be accessed without a transaction. Application 506 may thus identify the lowest cost content provider of access to a media asset using a transaction, and store information regarding this price and the corresponding content provider to a data structure, while the accumulated lowest cost may or may not reflect the fact that one or more media assets can be accessed without a transaction.

If at step 1104 application 506 determines that the media asset cannot be accessed without a transaction, application 506 may identify at step 1108 one or more content providers of the media asset and generate a list of content providers. The list generated at step 1104 may be generated entirely independently of the list generated in step 1010 of process 1000, may utilize some of the information also utilized in step 1010, may be the same list as the list generated in step 1010, and/or may be a copy of the list generated in step 1010. Step 1108 may also utilize the same techniques previously discussed in reference to step 1010 of process 1000 to generate some of the list or the entire list. For example, application 506 may utilize data information identifying the media asset received/retrieved in step 1102 to generate a search query or request and transmit the search query or request to remote server 534 or content source 530. In response, remote server 534 or content source 530 may transmit information regarding content providers capable of providing access to the media asset. Application 506 may also utilize the information identifying the media asset to retrieve information regarding content providers of the media asset from database 510. As another example, application 508 may retrieve a data structure from database 510 identifying potential content providers, and then communicate with a remote server associated with each potential content provider, such as content source 530, at this or a later stage (e.g., as part of step 1114) to determine whether the potential content provider is actually capable of providing access to the media asset. Once application 506 has received information regarding content providers of the media asset, application 506 may use this information to generate a list of content providers. This may involve parsing a document (e.g., a mark-up document of a website), extracting information from a data structure, and/or copying the received/retrieved information.

Also similar to step 1104 of process 1000, application 506 may filter the list of identified content providers of the media asset based on user preferences entered into the configuration interface. Data associated with the content provider, such as data retrieved from database 510 or data received from a remote server associated with the content provider, such as content source 530, may indicate what type of access the content provider provides. Content providers of a type of access that the user has indicated is not desirable may be removed from the list or never added to it in the first place. Furthermore, the list of content providers may be filtered and/or generated based on the lists presented under sources 920. For example, application 506 may add only content providers listed in list 928 (i.e., "Preferred Provider") to the list, or may supplement the list with content providers listed in list 924 (i.e., "Services") and/or list 926 (i.e., "Accounts").

At step 1110, which is similar to step 1012, application 506 sets the lowest price for receiving access to the media asset to a MAX value. Alternatively, application 506 sets the price charged by the first content provider in the identified list as the initial lowest price. Setting the lowest price may involve storing the value to a register or variable in the address space of application 506. Alternatively or in combination, application 506 may also store and maintain a pointer (or other data identifying a content provider) to the content provider charging the lowest price. Initially this pointer may be set to NULL or to the first content provider of the identified list of content providers.

At step 1112, application 506 determines a price charged by a first content provider of the identified list for providing access to the media asset. Step 1112 may or may not utilize techniques discussed in reference to step 1014. Application 506 may retrieve this price from a data structure in database 510 that is associated with the content provider, receive this price from server 502 or receive this price from a remote server associated with the content provider, such as content source 530, or from remote server 534. The price charged by each content provider may also have been added to the list of content providers as part of the process for generating the list. If not, this information may be added to the list or another data structure associated therewith. The prices charged by different content providers may also be determined using different approaches. For example, database 510 may store the price charged by a first content provider but not a second content provider. In this case, application 506 may retrieve the price charged by the first content provider from database 510, and interact with a remote server associated with the second content provider to determine the price charged by the second content provider. Furthermore, if the price is retrieved from database 510, application 506 may determine when this price was previously stored to database 510. If some time has passed since then, application 506 may determine the price using a second approach. Application 506 may also store the price determined using the second approach to database 510, thereby updating the information found in database 510.

At step 1114, application 506 determines whether the price charged by the content provider is lower than the lowest price. If it is, the lowest price is set at step 1116 to the price charged by the content provider. This may involve overwriting a variable of the memory space of application 506 to contain the new lowest price and/or overwriting a pointer (or other data identifying a content provider) to point to the content provider charging the new lowest price.

At step 1118, application 506 determines whether the content provider is the last content provider in the list. If it is not, application 506 proceeds to the next content provider in the list at step 1120, and steps 1112-1118 are repeated.

If at step 1118 application 506 determines that the content provider is the last content provider in the identified list, application 506 stores at step 1122 the lowest price charged by a content provider of the media asset and information identifying the corresponding content provider to a data structure. The information identifying the corresponding content provider may include a network address through which access to the media asset can be obtained, user readable information, such as the content provider's name, information identifying another application through which access can be received and/or other user or computer readable information. Storing the information to the data structure may involve generating a new data structure based on this information, inserting new information into an existing data structure, setting a link to point to an existing data structure and/or copying the content of another data structure.

At step 1124, application 506 determines whether the media asset is the last media asset of the media content collection. If it is not, application 506 proceeds at step 1126 to the next media asset, and repeats steps 1102-1124 with the next media asset.

If at step 1124 application 506 determines that the media asset is the last media asset of the media content collection, application 506 calculates a lowest price for receiving access to the media content collection using multiple transactions. This can be the sum of the lowest prices for receiving access to each of the individual media assets that make up the media content collection. The lowest price for receiving access to the media content collection using multiple transactions may or may not reflect the fact that some of the media assets can be accessed for free and without a transaction. Calculating the lowest price for receiving access to the media content collection using multiple transactions may involve retrieving the stored individual lowest prices, or the lowest price for receiving access to the media content collection using multiple transactions may be incremented by the lowest price of each individual media asset as the individual media assets are processed.

FIG. 12 is a flow chart of process 1200 which illustrates in greater detail the steps involved in executing steps 408 and 410 of process 400.

Having calculated the lowest price for receiving access to a media content collection using a single transaction and the lowest price for receiving access to a media content collection using multiple transactions, application 406 compares these two prices. This may involve a simple comparison to determine which is lower, or may take into account other factors, such as a potential preference for receiving access to the media content collection using a single transaction. Application 506 may also consider the types of access involved in receiving access to the media content collection using multiple transactions and a single transaction.

At step 1204, application 506 generates a display that indicates which of the two options, receiving access to the media content collection using a single or multiple transactions, costs less. This may involve generating a display only if one of the two options costs less, displaying information relating to only the cheaper option, or displaying information relating to both options, but visually indicating the cheaper option. The generated display may also include selectable options for receiving access to the media content collection through one or both options. Alternatively, application 506 may automatically begin taking the necessary steps to receive access to the media content collection, and inform the user afterwards how the media content collection is accessible. The display generated by application 506 may also include selectable options for receiving access to the media content collection using a single transaction but through a variety of types of access, receiving access to the individual media assets of the media content collection, receiving access to the media content collection at some time in the future, and/or receiving access to the media content collection by taking/not taking advantage of media assets accessible without a financial transaction.

At step 1206, application 506 may receive a user selection of an option to access the media content collection or an individual media asset. Regardless, whether this is for receiving access to the media content collection using a single transaction, receiving access to the media content collection using multiple transactions, or receiving access to a single media asset, application 506 may proceed to step 1208 to perform one or more financial transactions potentially necessary to provide this access. The financial transaction may be performed based on the information identifying content provider that was previously stored in step 1024 or step 1122, or located in database 510. For example, in response to a user selection of an option for accessing a media asset or media content collection, application 506 may retrieve a network address from one of these data structures and utilize the retrieved network address to communicate with a remote server of the content provider, such as content source 530, in order to perform a financial transaction. The financial transaction itself may involve transmitting account, identification and/or billing information to the corresponding remote server in order to authorize the remote server to charge an account associated with the user. If one or more media assets are requested that can be accessed without a financial transaction, this step is skipped for those media assets.

Depending on the type of access provided by the content provider of an individual media asset or the media content collection, one or more of steps 1210, 1214 and 1218 are performed next. If receiving access to the media content collection using multiple transactions is selected, steps 1210, 1214 and/or 1218 may be performed for each media asset of the media content collection. As with step 1208, media assets accessible without a transaction may involve alternative steps for accessing. For example, a media asset already stored in user device 504 may be simply played, and a recording may be scheduled for a media asset that is to be broadcast in the near future.

Steps 1210 and 1212 are involved in receiving access to a media asset or media content collection that is provided on physical merchandise. At step 1210, application 506 may communicate with a remote server associated with the content provider of the media asset or media content collection, such as content source 530, to order the physical merchandise. This may involve transmitting to a remote server associated with the content provider location information associated with the user's location to allow the content provider to ship the merchandise to the user. In response to completing the transaction, the content provider ships the merchandise to the user's location, allowing the user to input the merchandise into a drive of user device 504 or another device in communication with user device 504, thereby providing access to the media content collection or media asset. Alternatively, the transaction and shipping may be performed in person by the user. Application 504 may provide information to the user indicating a physical store where the physical merchandise can be purchased, and leave it to the user to perform the necessary transactions and transportation.

Steps 1214 and 1216 are involved in receiving access to a media asset or media content collection that is streamed over a network connection. At step 1214, application 506 communicates with a remote server, such as content source 530, to receive access to the media asset or media content collection being streamed. This may involve creating an account for the user, obtaining permission to access a website and/or starting to stream data from content source 530 to user device 504. The application 506 may also save information regarding the media content collection and how to access the media content collection in order to also allow the user to navigate a menu at a future time to access individual media assets or the entire media content collection. As the data containing the media asset or the media content collection is received, user device 504 displays the received data, thereby providing access to the media asset or media content collection.

Steps 1218 and 1220 are involved in receiving access to a media asset or media content collection that is downloaded from a remote server, such as content source 530. In response to completing the transaction, content source 530 may transmit one or more digital files containing a media asset or media content collection to user device 504. These digital files can be stored on a drive of user device 504, or on another device in communication with user device 504. The user may interact with application 506 or another application to cause user device 504 or another device to display the received digital files, thereby providing access to the media asset or the media content collection.

While the systems and methods described herein have mostly been discussed in terms of a single user device (i.e., user device 504), the systems and methods described herein can also be implemented within a cloud network. A user may interact with a first user device to select a media content collection for which process 400 is executed, a second user device to select from which content provider(s) access to the media content collection or a media asset is to be received, a third user device to actually play the media content collection or media asset, and a fourth user device to interact with configuration interface 900. Server 502 may be used to store user preferences, user selection and other information affecting the execution of process 400 and may provide any of this information in response to a query from any user device, thereby facilitating the distribution of process 400 across multiple user devices. A media content collection or a media asset can also be downloaded to or streamed through another user device different from the user device the user intends to play the media content collection or the media asset on. Furthermore, the user may specify ahead of time on which user devices the different steps involved in executing process 400 and providing access to the media content collection or the media asset are to be performed.

It will be apparent to those of ordinary skill in the art that the systems and methods involved in the present application may be embodied in a computer program product that includes a computer usable, non-transitory, and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

It is understood that the various features, elements, or processes of the foregoing figures and description are interchangeable or combinable to realize or practice the implementations describe herein. Those skilled in the art will appreciate that aspects of the application can be practiced by other than the described implementations, which are presented for purposes of illustration rather than of limitation, and the aspects are limited only by the claims which follow.

What is claimed is:

1. A method for receiving access to a media content series through a network connection, the method comprising:
receiving, using control circuitry, a user selection of an identifier of the media content series that includes a plurality of media assets;
retrieving, using the control circuitry, a first data structure from a provider of the media content series comprising a first price for receiving current access to the media content series, including the plurality of media assets, by way of a single purchase from the provider;

for each respective media asset of the plurality of media assets in the media content series:
  retrieving, using the control circuitry, data identifying a plurality of content providers for providing current access to the respective media asset by way of the network connection, wherein each content provider of the plurality of content providers is associated with a respective price for providing access to the respective media asset;
  determining, using the control circuitry and based on the respective price associated with each content provider, a respective lowest price for receiving current access to the respective media asset;
  storing, using the control circuitry, the respective lowest price and data identifying a respective content provider that is associated with the respective lowest price in a second data structure;
  accumulating, using the control circuitry, each respective lowest price stored in the second data structure to compute a second price for receiving current access to the media content series by way of purchasing each respective media asset from the respective content provider that is associated with the respective lowest price using multiple transactions;
  computing, using the control circuitry, a respective lowest respective future price for receiving access to the respective media asset from the respective content provider of the plurality of content providers at a future time;
  storing, using the control circuitry, the respective lowest future price for receiving access to the respective media asset at the future time in a third data structure; and
  accumulating, using the control circuitry, each respective lowest future price stored in the third data structure to compute a third price for receiving future access to the media content series by way of purchasing each respective media asset from the respective content provider that is associated with the respective lowest future price using multiple transactions at the future time;

generating for display, using the control circuitry, a plurality of user selectable options for purchasing the media content series comprising:
  a first option, corresponding to the first price, for receiving current access to the media content series by way of the single purchase;
  a second option, corresponding to the second price, for receiving current access to the media content series by way of the multiple transactions; and
  a third option, corresponding to the third price, for receiving future access to the media content series by way of multiple transactions at the future time;

receiving a user selection of one of the plurality of user selectable options;
determining, using the control circuitry, that the user selection corresponds to a highest of the first price, the second price, and the third price; and
in response to determining that the user selection corresponds to the highest of the first price, the second price, and the third price, generating for display, using the control circuitry, a warning that a more expensive option was selected.

2. The method of claim 1, wherein the data identifying a plurality of content providers for providing access to the respective media asset is retrieved in response to transmitting a query, by way of the network connection, to a database associated with a plurality of known content providers, wherein the query comprises information uniquely identifying the respective media asset.

3. The method of claim 1, wherein retrieving, using the control circuitry, data identifying the plurality of content providers for providing access to the respective media asset further comprises:
  retrieving the third data structure from memory, wherein the third data structure comprises information identifying a plurality of potential content providers;
  for each of the plurality of potential content providers:
    communicating with a server associated with the potential content provider to determine whether the potential content provider provides access to the respective media asset; and
    in response to determining that the potential content provider provides access to the respective media asset, storing an indication of the potential content provider as one of the plurality of content providers of the respective media asset.

4. The method of claim 3, further comprising communicating with the server associated with the potential content provider to determine a respective price for providing access to the respective media asset by way of the potential content provider when the potential content provider provides access to the respective media asset.

5. The method of claim 1, wherein the media content series is a digital media content collection, and wherein receiving access to the digital media content collection by way of the single purchase comprises receiving, via the network connection, current electronic access to the digital media content collection from the provider, and wherein receiving access to the digital media content collection by way the multiple transactions comprises receiving, via the network connection, current electronic access to each respective media asset from the respective content provider that is associated with the respective lowest price.

6. The method of claim 5, wherein receiving current electronic access to the digital media content collection by way of multiple transactions comprises:
  communicating with a first server, through the network connection, to complete a first purchase;
  in response to completing the first purchase, receiving current electronic access to a first media asset from the plurality of media assets in the digital media content collection from a first content provider of the plurality of content providers, wherein the first content provider is associated with the lowest price for the first media asset;
  communicating with a second server, through the network connection, to complete a second purchase; and
  in response to completing the second purchase, receiving current electronic access to a second media asset from the plurality of media assets in the digital media content collection from a second content provider of the plurality of content providers, wherein the second content provider is associated with the lowest price for the second media asset.

7. The method of claim 1, further comprising storing zero as the respective lowest price for receiving access to the respective media asset in the second data structure in response to determining that the respective media asset is accessible without purchase from the respective content provider.

8. A system for receiving access to a media content series, the system comprising control circuitry that:
- receives a user selection of a media content series that includes a plurality of media assets;
- retrieves a first data structure from a provider of the media content series comprising a first price for receiving current access to the media content series, including the plurality of media assets, by way of a single purchase from the provider;
- for each respective media asset of the plurality of media assets in the media content series:
   - retrieves data identifying a plurality of content providers for providing current access to the respective media asset, wherein each content provider of the plurality of content providers is associated with a respective price for providing access to the respective media asset;
   - determines, based on the respective price associated with each content provider, a respective lowest price for receiving current access to the respective media asset;
   - stores the respective lowest price and data identifying a respective content provider that is associated with the respective lowest price in a second data structure;
   - accumulates each respective lowest price stored in the second data structure to compute a second price for receiving current access to the media content series by way of purchasing each respective media asset from the respective content provider that is associated with the respective lowest price using multiple transactions;
   - computes a respective lowest future price for receiving access to the respective media asset from the respective content provider of the plurality of content providers at a future time;
   - stores the respective lowest future price for receiving access to the respective media asset at the future time in a third data structure; and
   - accumulates each respective lowest future price stored in the third data structure to compute a third price for receiving future access to the media content series by way of purchasing each respective media asset from the respective content provider that is associated with the respective lowest future price using multiple transactions at the future time;
- generates for display a plurality of user selectable options for purchasing the media content series comprising:
   - a first option, corresponding to the first price, for receiving current access to the media content series by way of the single purchase;
   - a second option, corresponding to the second price, for receiving access to the media content series by way of the multiple transactions; and
   - a third option, corresponding to the third price, for receiving future access to the media content series by way of multiple transactions at the future time;
- receives a user selection of one of the plurality of user selectable options;
- determines that the user selection corresponds to a highest of the first price, the second price, and the third price; and
- in response to determining that the user selection corresponds to the highest of the first price, the second price, and the third price, generates for display a warning that a more expensive option was selected.

9. The system of claim 8, wherein the data identifying a plurality of content providers for providing access to the respective media asset is retrieved, by the control circuitry, in response to transmitting a query, by way of the network connection, to a database associated with a plurality of known content providers, wherein the query comprises information uniquely identifying the respective media asset.

10. The system of claim 8, wherein the control circuitry, when retrieving data identifying the plurality of content providers for providing access to the respective media asset, further:
- retrieves the third data structure from memory, wherein the third data structure comprises information identifying a plurality of potential content providers;
- for each of the plurality of potential content providers:
   - communicates with a server associated with the potential content provider to determine whether the potential content provider provides access to the respective media asset; and
   - in response to determining that the potential content provider provides access to the respective media asset, stores an indication of the potential content provider as one of the plurality of content providers of the respective media asset.

11. The system of claim 10, wherein the control circuitry further communicates with the server associated with the potential content provider to determine a respective price for providing access to the respective media asset by way of the potential content provider when the potential content provider provides access to the respective media asset.

12. The system of claim 8, wherein the media content series is a digital media content collection, and wherein the control circuitry, when receiving access to the digital media content collection by way of the single purchase, further receives, via the network connection, current electronic access to the digital media content collection from the provider, and wherein the control circuitry, when receiving access to the digital media content collection by way the multiple transactions, further receives, via the network connection, current electronic access to each respective media asset from the respective content provider that is associated with the respective lowest price.

13. The system of claim 12, wherein the control circuitry, when receiving current electronic access to the digital media content collection by way of multiple transactions, further:
- communicates with a first server, through the network connection, to complete a first purchase;
- in response to completing the first purchase, receives current electronic access to a first media asset from the plurality of media assets in the digital media content collection from a first content provider of the plurality of content providers, wherein the first content provider is associated with the lowest price for the first media asset;
- communicates with a second server, through the network connection, to complete a second purchase; and
- in response to completing the second purchase, receives current electronic access to a second media asset from the plurality of media assets in the digital media content collection from a second content provider of the plurality of content providers, wherein the second content provider is associated with the lowest price for the second media asset.

14. The system of claim 8, wherein the control circuitry further stores zero as the respective lowest price for receiving access to the respective media asset in the second data structure in response to determining that the respective media asset is accessible without purchase from the respective content provider.

\* \* \* \* \*